(12) United States Patent
Kurabayashi

(10) Patent No.: US 12,141,190 B2
(45) Date of Patent: Nov. 12, 2024

(54) MEDIUM RECOMMENDATION SYSTEM, TABLE CREATION SYSTEM, MEDIUM RECOMMENDATION DEVICE, AND TABLE CREATION METHOD

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 277 days.

(21) Appl. No.: 17/579,151

(22) Filed: Jan. 19, 2022

(65) Prior Publication Data

US 2022/0138244 A1 May 5, 2022

Related U.S. Application Data

(63) Continuation of application No. PCT/JP2020/027516, filed on Jul. 15, 2020.

(30) Foreign Application Priority Data

Jul. 19, 2019 (JP) .................................. 2019-133762

(51) Int. Cl.
*G06F 16/435* (2019.01)
*A63F 13/35* (2014.01)
(Continued)

(52) U.S. Cl.
CPC ............ *G06F 16/435* (2019.01); *A63F 13/35* (2014.09); *A63F 13/5375* (2014.09);
(Continued)

(58) Field of Classification Search
CPC .... G06F 16/435; G06F 16/41; G06F 16/9535; G06F 16/9538; A63F 13/35;
(Continued)

(56) References Cited

U.S. PATENT DOCUMENTS

| 2011/0191716 A1* | 8/2011 | Sakamoto | ............... G06F 16/68 715/810 |
| 2014/0194178 A1* | 7/2014 | Kawada | .............. G07F 17/3225 463/31 |

(Continued)

FOREIGN PATENT DOCUMENTS

| JP | 4886749 B2 | 2/2012 |
| JP | 2015126829 A * | 7/2015 |

(Continued)

OTHER PUBLICATIONS

Office Action issued in Japanese Application No. 2019-133762; Dated Dec. 2, 2019 (5 pages).
(Continued)

*Primary Examiner* — Mark D Featherstone
*Assistant Examiner* — Samuel C Sharpless, III
(74) *Attorney, Agent, or Firm* — Osha Bergman Watanabe & Burton LLP

(57) ABSTRACT

One or more embodiments of the invention is a medium recommendation system for recommending media or sets of media in a game that proceeds as a user selects media from a possessed medium group constructed to include D media and places the media in a game field, the recommended media or sets of media being media or sets of media to be added to a medium in order to construct at least a portion of the possessed medium group from the medium, the medium recommendation system including: an input acceptance unit that accepts the input of a single medium among the T kinds of media; a table storage unit that stores first tables; and a medium recommendation unit that is capable of outputting, as recommendation information, media or sets of media with which the single medium accepted by the input acceptance unit is associated in the first tables.

11 Claims, 10 Drawing Sheets

(51) Int. Cl.
*A63F 13/5375* (2014.01)
*G06F 16/41* (2019.01)
*A63F 13/80* (2014.01)

(52) U.S. Cl.
CPC .............. *G06F 16/41* (2019.01); *A63F 13/80* (2014.09); *A63F 2300/305* (2013.01)

(58) Field of Classification Search
CPC .................. A63F 13/5375; A63F 13/80; A63F 2300/305; A63F 13/58; A63F 13/69
See application file for complete search history.

(56) References Cited

U.S. PATENT DOCUMENTS

| | | | | |
|---|---|---|---|---|
| 2014/0295929 | A1* | 10/2014 | Otomo | .................. G07F 17/323 463/11 |
| 2020/0384346 | A1 | 12/2020 | Yoshida | |

FOREIGN PATENT DOCUMENTS

| | | | |
|---|---|---|---|
| JP | 6501938 | B1 | 4/2019 |
| JP | 6513776 | B1 | 5/2019 |

OTHER PUBLICATIONS

International Search Report issued in International Application No. PCT/JP2020/027516, mailed Sep. 1, 2020 (5 pages).
Written Opinion issued in International Application No. PCT/JP2020/027516; Dated Sep. 1, 2020 (6 pages).

\* cited by examiner

FIG.8 k=2

| Key | Value (Y ELEMENTS) |
|---|---|
| card-1 | [card-$i_{1-1}$, card-$i_{1-2}$, $\cdots$, card-$i_{1-Y}$] |
| card-2 | [card-$i_{2-1}$, card-$i_{2-2}$, $\cdots$, card-$i_{2-Y}$] |
| $\vdots$ | $\vdots$ |
| card-T | [card-$i_{T-1}$, card-$i_{T-2}$, $\cdots$, card-$i_{T-Y}$] | k=3

| Key | Value (Y ELEMENTS) |
|---|---|
| card-1 | [cardset-$i(2)_{1-1}$, cardset-$i(2)_{1-2}$, $\cdots$, cardset-$i(2)_{1-Y}$] |
| card-2 | [cardset-$i(2)_{2-1}$, cardset-$i(2)_{2-2}$, $\cdots$, cardset-$i(2)_{2-Y}$] |
| $\vdots$ | $\vdots$ |
| card-T | [cardset-$i(2)_{T-1}$, cardset-$i(2)_{T-2}$, $\cdots$, cardset-$i(2)_{T-Y}$] |

$\vdots$ k=40

| Key | Value (Y ELEMENTS) |
|---|---|
| card-1 | [cardset-$i(39)_{1-1}$, cardset-$i(39)_{1-2}$, $\cdots$, cardset-$i(39)_{1-Y}$] |
| card-2 | [cardset-$i(39)_{2-1}$, cardset-$i(39)_{2-2}$, $\cdots$, cardset-$i(39)_{2-Y}$] |
| $\vdots$ | $\vdots$ |
| card-T | [cardset-$i(39)_{T-1}$, cardset-$i(39)_{T-2}$, $\cdots$, cardset-$i(39)_{T-Y}$] |

FIG.9 k=2

| Key | Value (Y ELEMENTS) |
|---|---|
| [cardset-e(2) -1] | [card-e(2)$_{1-1}$, card-e(2)$_{1-2}$, $\cdots$, card-e(2)$_{1-Y}$] |
| [cardset-e(2) -2] | [card-e(2)$_{2-1}$, card-e(2)$_{2-2}$, $\cdots$, card-e(2)$_{2-Y}$] |
| $\vdots$ | $\vdots$ |
| [cardset-e(2) -Z] | [card-e(2)$_{Z-1}$, card-e(2)$_{Z-2}$, $\cdots$, card-e(2)$_{Z-Y}$] | k=3

| Key | Value (Y ELEMENTS) |
|---|---|
| [cardset-e(3) -1] | [card-e(3)$_{1-1}$, card-e(3)$_{1-2}$, $\cdots$, card-e(3)$_{1-Y}$] |
| [cardset-e(3) -2] | [card-e(3)$_{2-1}$, card-e(3)$_{2-2}$, $\cdots$, card-e(3)$_{2-Y}$] |
| $\vdots$ | $\vdots$ |
| [cardset-e(3) -Z] | [card-e(3)$_{Z-1}$, card-e(3)$_{Z-2}$, $\cdots$, card-e(3)$_{Z-Y}$] |

$\vdots$ k=39

| Key | Value (Y ELEMENTS) |
|---|---|
| [cardset-e(39) -1] | [card-e(39)$_{1-1}$, card-e(39)$_{1-2}$, $\cdots$, card-e(39)$_{1-Y}$] |
| [cardset-e(39) -2] | [card-e(39)$_{2-1}$, card-e(39)$_{2-2}$, $\cdots$, card-e(39)$_{2-Y}$] |
| $\vdots$ | $\vdots$ |
| [cardset-e(39) -Z] | [card-e(39)$_{Z-1}$, card-e(39)$_{Z-2}$, $\cdots$, card-e(39)$_{Z-Y}$] |

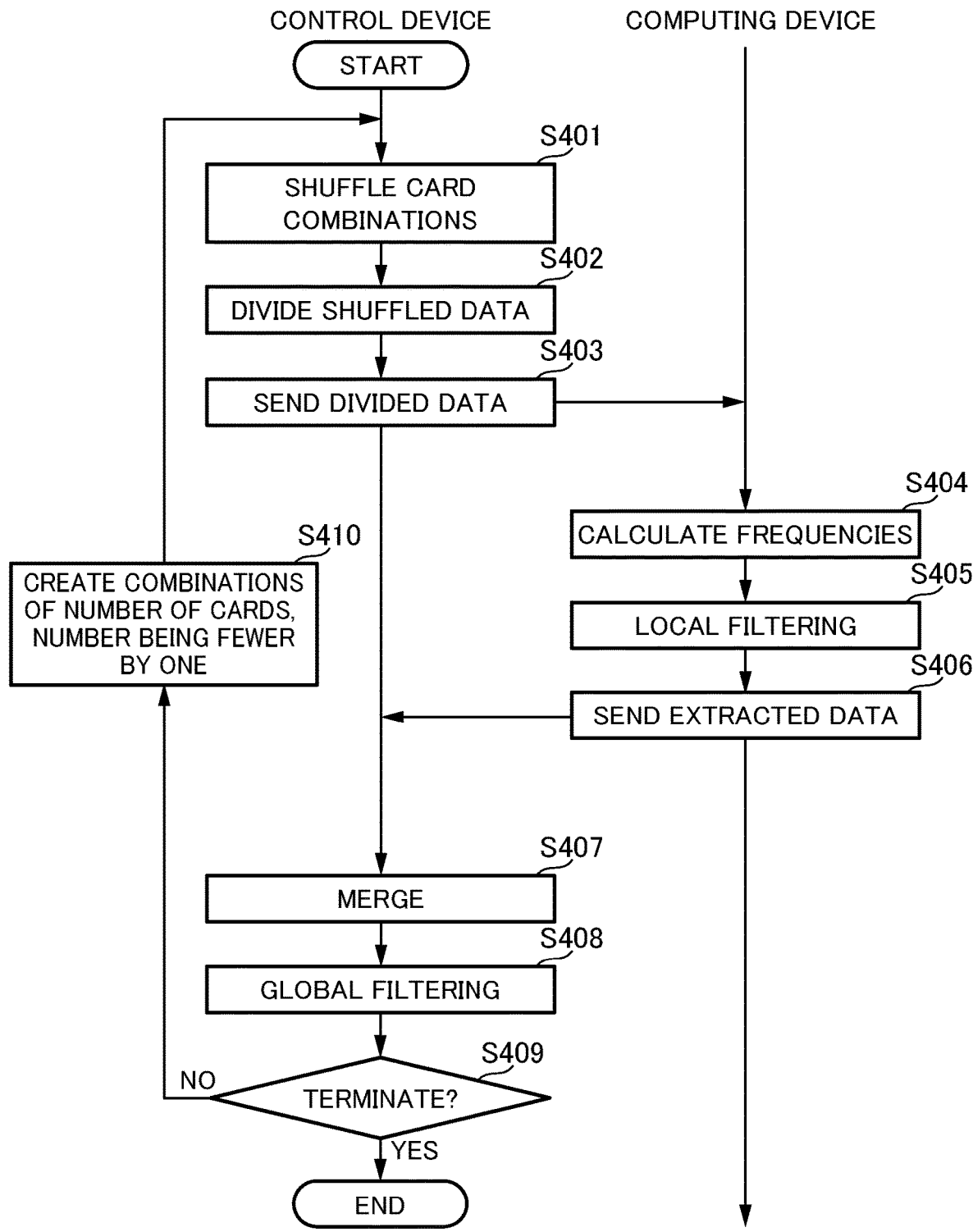

MEDIUM RECOMMENDATION SYSTEM, TABLE CREATION SYSTEM, MEDIUM RECOMMENDATION DEVICE, AND TABLE CREATION METHOD

TECHNICAL FIELD

The present invention relates to medium recommendation systems, table creation systems, medium recommendation devices, and table creation methods.

BACKGROUND ART

Recently, there is an increasing number of players who enjoy online games in which a plurality of players can participate via a network. Such a game is realized by a game system in which a portable terminal device or the like carries out communication with a server device or the like of a game administrator, which allows a player who operates the portable terminal device to play battles against other players.

As a type of online game, there is a type of card game called digital collectible card games (DCCGs), in which various actions are executed in accordance with combinations of game media such as cards or characters. As the number of media in a game that is provided increases linearly, the strategic intricacies of the game improve drastically, while the number of combinations of game media increases explosively.

CITATION LIST

Patent Literature

{PTL 1}
Publication of Japanese Patent No. 4886749

SUMMARY OF INVENTION

Technical Problem

The mainstream of existing information recommendation technology has been the type in which recommendations are provided while using limited combinations or similarity in preferences among users as keys. Specifically, with existing information recommendation technology, the possibilities of purchases of other items are estimated from attribute information of a user or history information such as the purchase history of the user, for which a model can be created in the form of a matrix interpolation problem. For example, Patent Literature 1 discloses a recommended-product selection device relating to existing information recommendation technology.

The above technology is used in e-commerce sites, etc. However, as opposed to purchasing products in e-commerce, since there is a possibility that a user possesses all media in a DCCG and there are cases where a user obtains media at random, it has been difficult to apply the above technology directly to a technology for recommending media in a DCCG, such as cards. Therefore, there is a demand for a technology for recommending media or sets of media suitable for a user in an online game such as a DCCG.

The present invention has been made in order to solve the problem described above, and it is a main object thereof to provide a medium recommendation system, etc. that make it possible to recommend media or sets of media suitable for a user in an online game.

Solution to Problem

In order to achieve the above object, a medium recommendation system according to an aspect of the present invention is a medium recommendation system for recommending media or sets of media in a game that proceeds as a user selects media from a possessed medium group constructed to include D media and places the media in a game field, the recommended media or sets of media being media or sets of media to be added to a medium in order to construct at least a portion of the possessed medium group from the medium, the individual media included in the possessed medium group being individually selected from T kinds of media included in a medium set preset in the game, the medium recommendation system being characterized by including:

an input acceptance unit that accepts the input of a single medium among the T kinds of media;

a table storage unit that stores first tables created by further extracting a prescribed number of sets of media having high frequencies of occurrence, for each kind of medium, from sets of media consisting of k ($2 \leq k \leq D$) media, the sets of media being included with high frequencies of occurrence in a plurality of possessed medium groups used by a prescribed plurality of users, and the sets of media being extracted in advance on the basis of possessed-medium-group information concerning the plurality of possessed medium groups, and by associating, for each kind of medium, a single medium with media or sets of media obtained by excluding that medium from the further extracted sets of media; and a medium recommendation unit that is capable of outputting, as recommendation information, the media or sets of media with which the single medium accepted by the input acceptance unit is associated in the first tables.

Furthermore, in order to achieve the above object, a table creation system according to an aspect of the present invention is a table creation system for creating tables for recommending media or sets of media in a game that proceeds as a user selects media from a possessed medium group constructed to include D media and places the media in a game field, the recommended media or sets of media being media or sets of media to be added to a medium in order to construct at least a portion of the possessed medium group from the medium, the individual media included in the possessed medium group being individually selected from T kinds of media included in a medium set preset in the game, the table creation system being characterized in that:

tables are created by further extracting a prescribed number of sets of media having high frequencies of occurrence, for each kind of medium, from sets of media consisting of k ($2 \leq k \leq D$) media, the sets of media being included with high frequencies of occurrence in a plurality of possessed medium groups used by a prescribed plurality of users, and the sets of media being extracted in advance on the basis of possessed-medium-group information concerning the plurality of possessed medium groups, and by associating, for each kind of medium, a single medium with media or sets of media obtained by excluding that medium from the further extracted sets of media.

Furthermore, in order to achieve the above object, a medium recommendation device according to an aspect of the present invention is a medium recommendation device for recommending media or sets of media in a game that proceeds as a user selects media from a possessed medium group constructed to include D media and places the media in a game field, the recommended media or sets of media being media or sets of media to be added to a medium in order to construct at least a portion of the possessed medium group from the medium, the individual media included in the possessed medium group being individually selected from T kinds of media included in a medium set preset in the game, the medium recommendation device being characterized by comprising:

an input acceptance unit that accepts the input of a single medium among the T kinds of media;

a table storage unit that stores first tables created by further extracting a prescribed number of sets of media having high frequencies of occurrence, for each kind of medium, from sets of media consisting of k ($2 \leq k \leq D$) media, the sets of media being included with high frequencies of occurrence in a plurality of possessed medium groups used by a prescribed plurality of users, and the sets of media being extracted in advance on the basis of possessed-medium-group information concerning the plurality of possessed medium groups, and by associating, for each kind of medium, a single medium with media or sets of media obtained by excluding that medium from the further extracted sets of media; and a medium recommendation unit that is capable of outputting, as recommendation information, the media or sets of media with which the single medium accepted by the input acceptance unit is associated in the first tables.

Furthermore, in order to achieve the above object, a table creation method according to an aspect of the present invention is a table creation method for creating tables for recommending media or sets of media in a game that proceeds as a user selects media from a possessed medium group constructed to include D media and places the media in a game field, the recommended media or sets of media being media or sets of media to be added to a medium in order to construct at least a portion of the possessed medium group from the medium, the individual media included in the possessed medium group being individually selected from T kinds of media included in a medium set preset in the game, the table creation method being characterized by including:

a step of extracting, for each of k=2 to D, sets of media consisting of k ($2 \leq k \leq D$) media, the sets of media being included with high frequencies of occurrence in a plurality of possessed medium groups used by a prescribed plurality of users, on the basis of possessed-medium-group information concerning the plurality of possessed medium groups;

a step of further extracting, for each of k=2 to D, a prescribed number of sets of media having high frequencies of occurrence, for each kind of medium, from the extracted sets of media consisting of k media and having high frequencies of occurrence; and a step of creating tables, for each of k=2 to D, by associating, for each kind of medium, a single medium with media or sets of media obtained by excluding that medium from the further extracted sets of media.

Furthermore, in order to achieve the above object, a medium recommendation system according to an aspect of the present invention is a medium recommendation system for recommending media in a game that proceeds as a user selects media from a possessed medium group constructed to include D media and places the media in a game field, the recommended media being media to be added to a set of media in order to construct at least a portion of the possessed medium group from the set of media, the individual media included in the possessed medium group being individually selected from a medium set preset in the game and including T kinds of media, the medium recommendation system being characterized by including:

an input acceptance unit that accepts the input of a set of media consisting of k media ($2 \leq k \leq D-1$) and constituting at least a portion of the possessed medium group;

a table storage unit that stores second tables generated by, while using sets of media consisting of k media and sets of media consisting of (k+1) media, these sets of media being included with high frequencies of occurrence in a plurality of possessed medium groups used by a prescribed plurality of users and being extracted in advance on the basis of possessed-medium-group information concerning the plurality of possessed medium groups, individually joining media included in the medium set to each of the sets of media consisting of k media and extracted in advance, thereby generating a plurality of sets of media consisting of (k+1) media, calculating, for each of the sets of media consisting of k media and extracted in advance, the individual frequencies of occurrence of the plurality of generated sets of media consisting of (k+1) media with reference to the sets of media consisting of (k+1) media and extracted in advance, thereby further extracting, for each of the sets of media consisting of k media and extracted in advance, a prescribed number of sets of media consisting of (k+1) media and having high frequencies of occurrence from the plurality of generated sets of media consisting of (k+1) media, and associating the individual sets of media consisting of k media and extracted in advance with media to be added in order to generate the further extracted sets of media consisting of (k+1) media and having high frequencies of occurrence; and a medium recommendation unit that is capable of outputting, as recommendation information, the media to be added in order to generate the set of media consisting of (k+1) media and with which the set of media consisting of k media and accepted by the input acceptance unit is associated in the second tables.

Furthermore, in the present invention, preferably, the second tables are generated by, while using sets of media consisting of k media ($2 \leq k \leq D-1$) and sets of media consisting of (k+1) media, these sets of media being included with high frequencies of occurrence in a plurality of possessed medium groups used by a prescribed plurality of users and being extracted in advance on the basis of possessed-medium-group information concerning the plurality of possessed medium groups, individually joining T kinds of media included in the medium set to each of the sets of media consisting of k media and extracted in advance, thereby generating T sets of media consisting of (k+1) media, calculating, for each of the sets of media consisting of k media and extracted in advance, the individual frequencies of occurrence of the T generated sets of media consisting of (k+1) media with reference to the sets of media consisting of (k+1) media and extracted in advance, thereby further extracting, for each of the sets of media consisting of k media and extracted in advance, a prescribed number of sets of media consisting of (k+1) media and having high frequencies of occurrence from the T generated sets of media consisting of (k+1) media, and associating the individual sets of media consisting of k media and extracted in advance with media to be added in order to generate the further extracted sets of media consisting of (k+1) media and having high frequencies of occurrence.

Furthermore, in order to achieve the above object, a table creation system according to an aspect of the present invention is a table creation system for creating tables for recommending media in a game that proceeds as a user selects media from a possessed medium group constructed to include D media and places the media in a game field, the recommended media being media to be added to a set of media in order to construct at least a portion of the possessed medium group from the set of media, the individual media included in the possessed medium group being individually selected from a medium set preset in the game and including T kinds of media, the table creation system being characterized in that:

tables are created by, while using sets of media consisting of k media ($2 \leq k \leq D-1$) and sets of media consisting of (k+1) media, these sets of media being included with high frequencies of occurrence in a plurality of possessed medium groups used by a prescribed plurality of users and being extracted in advance on the basis of possessed-medium-group information concerning the plurality of possessed medium groups, individually joining media included in the medium set to each of the sets of media consisting of k media and extracted in advance, thereby generating a plurality of sets of media consisting of (k+1) media, calculating, for each of the sets of media consisting of k media and extracted in advance, the individual frequencies of occurrence of the plurality of generated sets of media consisting of (k+1) media with reference to the sets of media consisting of (k+1) media and extracted in advance, thereby further extracting, for each of the sets of media consisting of k media and extracted in advance, a prescribed number of sets of media consisting of (k+1) media and having high frequencies of occurrence from the plurality of generated sets of media consisting of (k+1) media, and associating the individual sets of media consisting of k media and extracted in advance with media to be added in order to generate the further extracted sets of media consisting of (k+1) media and having high frequencies of occurrence.

Furthermore, a medium recommendation device according to an aspect of the present invention is a medium recommendation device for recommending media in a game that proceeds as a user selects media from a possessed medium group constructed to include D media and places the media in a game field, the recommended media being media to be added to a set of media in order to construct at least a portion of the possessed medium group from the set of media, the individual media included in the possessed medium group being individually selected from a medium set preset in the game and including T kinds of media, the medium recommendation device being characterized by including:

an input acceptance unit that accepts the input of a set of media consisting of k media ($2 \leq k \leq D-1$) and constituting at least a portion of the possessed medium group;

a table storage unit that stores second tables generated by, while using sets of media consisting of k media and sets of media consisting of (k+1) media, these sets of media being included with high frequencies of occurrence in a plurality of possessed medium groups used by a prescribed plurality of users and being extracted in advance on the basis of possessed-medium-group information concerning the plurality of possessed medium groups, individually joining media included in the medium set to each of the sets of media consisting of k media and extracted in advance, thereby generating a plurality of sets of media consisting of (k+1) media, calculating, for each of the sets of media consisting of k media and extracted in advance, the individual frequencies of occurrence of the plurality of generated sets of media consisting of (k+1) media with reference to the sets of media consisting of (k+1) media and extracted in advance, thereby further extracting, for each of the sets of media consisting of k media and extracted in advance, a prescribed number of sets of media consisting of (k+1) media and having high frequencies of occurrence from the plurality of generated sets of media consisting of (k+1) media, and associating the individual sets of media consisting of k media and extracted in advance with media to be added in order to generate the further extracted sets of media consisting of (k+1) media and having high frequencies of occurrence; and a medium recommendation unit that is capable of outputting, as recommendation information, the media to be added in order to generate the set of media consisting of (k+1) media and with which the set of media consisting of k media and accepted by the input acceptance unit is associated in the second tables.

Furthermore, in order to achieve the above object, a table creation method according to an aspect of the present invention is a table creation method for creating tables for recommending media in a game that proceeds as a user selects media from a possessed medium group constructed to include D media and places the media in a game field, the recommended media being media to be added to a set of media in order to construct at least a portion of the possessed medium group from the set of media, the individual media included in the possessed medium group being individually selected from a medium set preset in the game and including T kinds of media, the table creation method being characterized by including:

a step of extracting, for each of k=2 to D−1, sets of media consisting of k media ($2 \leq k \leq D-1$) and included with high frequencies of occurrence in a plurality of possessed medium groups used by a prescribed plurality of users, on the basis of possessed-medium-group information concerning the plurality of possessed medium groups;

a step of individually joining, for each of k=2 to D−1, media included in the medium set to each of the extracted sets of media consisting of k media, thereby generating a plurality of sets of media consisting of (k+1) media, calculating, for each of the extracted sets of media consisting of k media, the individual frequencies of occurrence of the plurality of generated sets of media consisting of (k+1) media with reference to the extracted sets of media consisting of (k+1) media, thereby further extracting, for each of the extracted sets of media consisting of k media, a prescribed number of sets of media consisting of (k+1) media and having high frequencies of occurrence from the plurality of generated sets of media consisting of (k+1) media; and a step of creating a table by associating, for each of k=2 to D−1, the individual extracted sets of media consisting of k media with media to be added in order to generate the further extracted sets of media consisting of (k+1) media and having high frequencies of occurrence.

Furthermore, in the present invention, preferably, the table creation system further includes a medium extraction system for extracting combinations of arbitrary numbers of media, included with high frequencies of occurrence in the possessed medium groups, the medium extraction system includes:

a storage unit that stores the possessed-medium-group information; and an extraction unit that is capable of calculating the individual frequencies of occurrence of the sets consisting of m media ($2 \leq m \leq D$) with reference to the possessed-medium-group information stored in the storage unit, and extracting sets consisting of m media and having high frequencies of occurrence satisfying a prescribed criterion, and the extraction unit is capable of generating a plurality of sets consisting of (m+1) media by individually joining media included in the medium set to each of the extracted sets, or is capable of generating a plurality of sets consisting of (m−1) media by individually excluding, from each of the extracted sets, a single medium among the media constituting the extracted set.

Furthermore, in the present invention, preferably, the extraction unit of the medium extraction system regularly and individually extracts sets consisting of 2 to D media and having high frequencies of occurrence satisfying a prescribed criterion, and the table creation system regularly creates tables on the basis of sets of k media (2≤k≤D) included with high frequencies of occurrence in the possessed medium groups and extracted by the extraction unit.

Advantageous Effects of Invention

The present invention makes it possible to recommend media or sets of media suitable for a user in an online game.

BRIEF DESCRIPTION OF DRAWINGS

FIG. 8 shows example first tables that are generated by a table creation unit in the first embodiment.

FIG. 9 shows example second tables that are generated by a table creation unit in a second embodiment.

FIG. 14 explains subtractive inference processing of a medium extraction system that extracts combinations of k cards, where k signifies an arbitrary number.

DESCRIPTION OF EMBODIMENTS

Now, systems according to embodiments of the present invention will be described with reference to the drawings.

Figure 1:
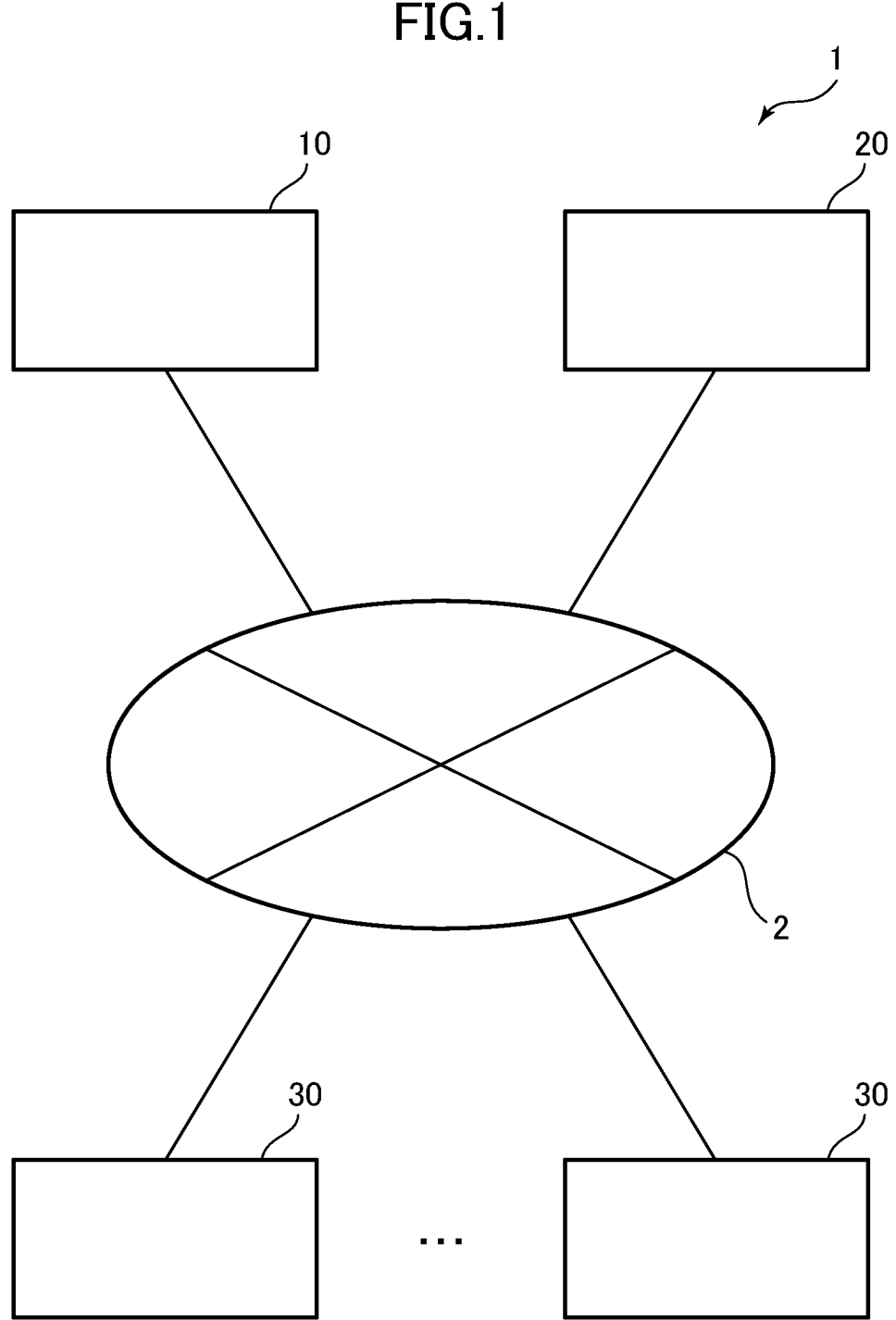
FIG. 1 is an overall configuration diagram of a medium recommendation system in one embodiment of the present invention.

FIG. 1 is an overall configuration diagram of a medium recommendation system 1 in one embodiment of the present invention. As shown in FIG. 1, the medium recommendation system 1 includes a medium recommendation server 10, a game server 20, and electronic devices 30, which are connected to a network 2, such as the Internet, so as to be able to communicate with each other.

Figure 2:
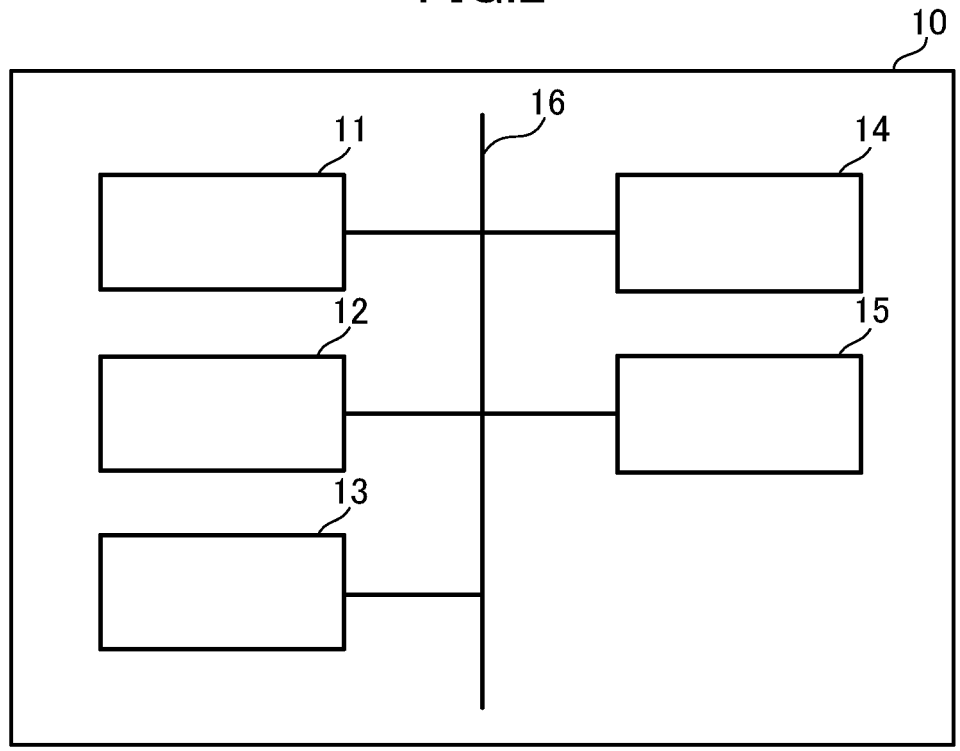
FIG. 2 is a block diagram showing the hardware configuration of a medium recommendation server in one embodiment of the present invention.

FIG. 2 is a block diagram showing the hardware configuration of the medium recommendation server 10 in one embodiment of the present invention. The medium recommendation server 10 in this embodiment includes a configuration similar to that of an ordinary server. In one example, the medium recommendation server 10 includes a plurality of computers and server devices. The medium recommendation server 10 includes a processor 11, an input device 12, an output device 13, a storage device 14, and a communication device 15. These individual constituent devices are connected via a bus 16. Interfaces are interposed as needed between the bus 16 and the individual constituent devices.

The processor 11 controls the operation of the medium recommendation server 10 as a whole; for example, the processor 11 is a CPU. The processor 11 executes various kinds of processing by loading programs and data stored in the storage device 14 and executing the programs. In one example, the processor 11 is constituted of a plurality of processors.

The input device 12 is a user interface that accepts inputs to the medium recommendation server 10 from a user; for example, the input device 12 is a touchscreen, a touchpad, a keyboard, or a mouse. The output device 13 outputs or displays output information of the medium recommendation server 10 to the user; for example, the output device 13 is a display or a printer that outputs an image.

The storage device 14 includes a main storage device and an auxiliary storage device. The main storage device is a semiconductor memory, such as a RAM. The RAM is a volatile storage medium that allows high-speed reading and writing of information and is used as a storage area and a work area when the processor 11 processes information. The main storage device may include a ROM, which is a read-only, non-volatile storage medium. In this case, the ROM stores programs such as firmware. The auxiliary storage device stores various programs as well as data used by the processor 11 when executing the individual programs. The auxiliary storage device is, for example, a hard disk device; however, the auxiliary storage device may be any type of non-volatile storage or non-volatile memory that is capable of storing information, which may be of the removable type. For example, the auxiliary storage device stores an operating system (OS), middleware, application programs, various kinds of data that may be referred to as these programs are executed, etc.

The medium recommendation server 10 has the function of a database server. The storage device 14 stores data (e.g., tables) and programs for a database, and the database is realized by executing the programs.

The communication device 15 is a wireless LAN module that is capable of sending data to and receiving data from other computers, such as user terminals or servers, via the network. Alternatively, however, the communication device 15 may be a wireless communication device of other types, such as a Bluetooth (registered trademark) module, or may be a wired communication device such as an Ethernet (registered trademark) module or a USB interface.

Figure 3:
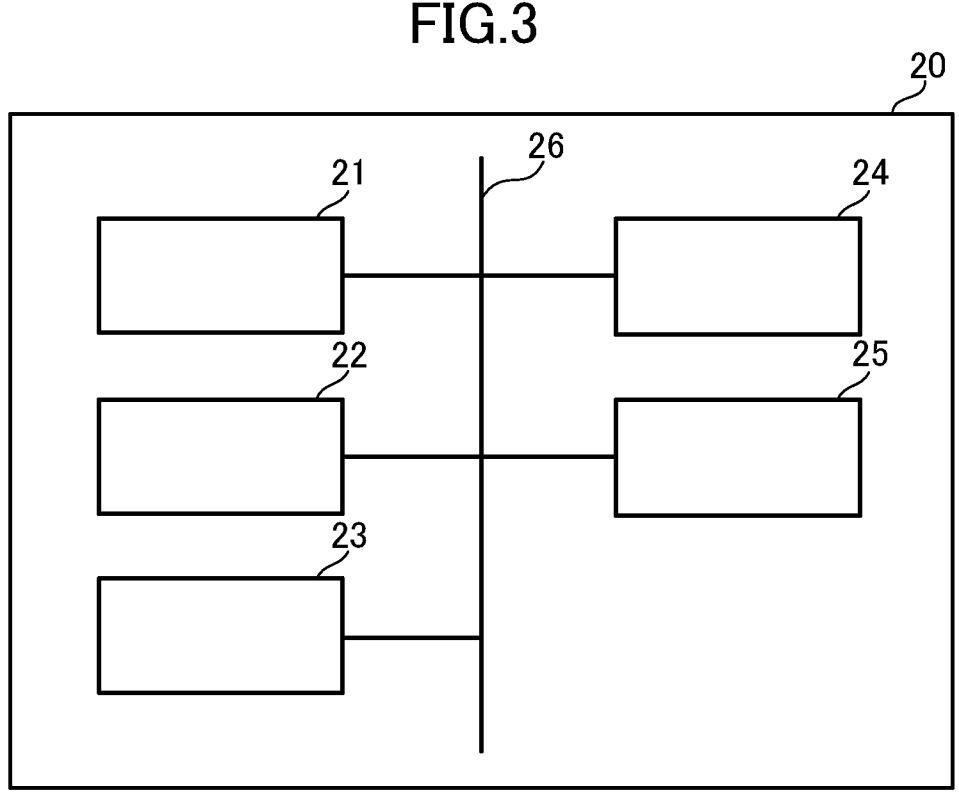
FIG. 3 is a block diagram showing the hardware configuration of a game server in one embodiment of the present invention.

FIG. 3 is a block diagram showing the hardware configuration of the game server 20 in one embodiment of the present invention. The game server 20 in this embodiment includes a configuration similar to that of an ordinary server. In one example, the game server 20 is a known server computer. The game server 20 includes a processor 21, an input device 22, an output device 23, a storage device 24, and a communication device 25. These individual constituent devices are connected via a bus 26. Interfaces are interposed as needed between the bus 26 and the individual constituent devices. The individual elements, namely, the processor 21, the input device 22, the output device 23, the storage device 24, and the communication device 25, respectively correspond to and have configurations similar to those of the processor 11, the input device 12, the output device 13, the storage device 14, and the communication device 15 described above, and thus descriptions thereof will be omitted. In one example, the game server 20 is configured to include a plurality of server devices.

Figure 4:
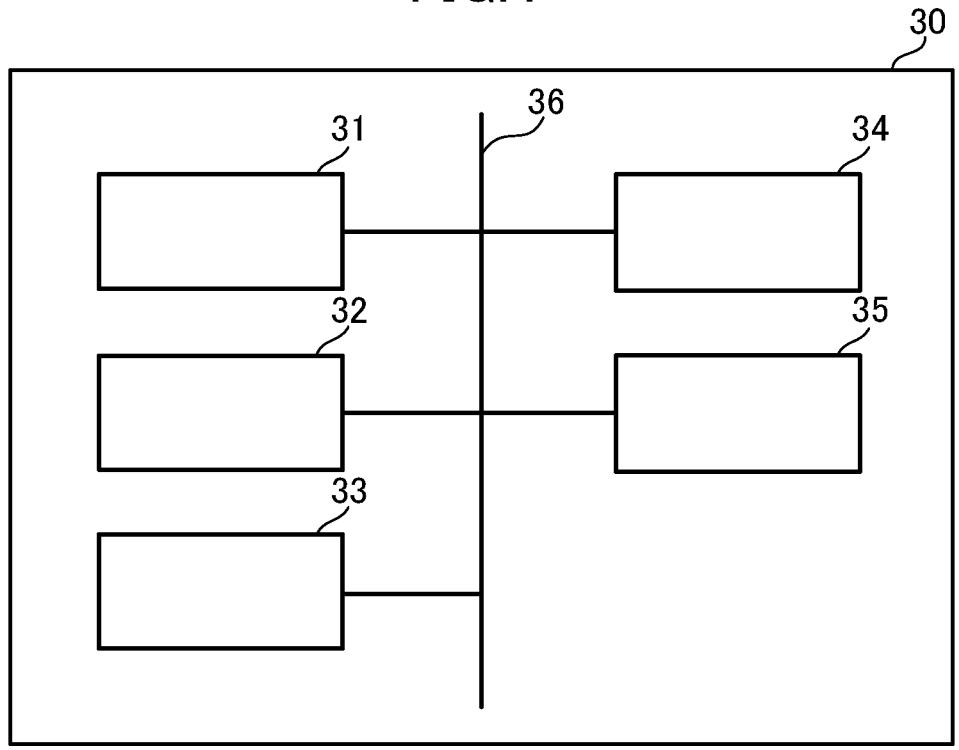
FIG. 4 is a block diagram showing the hardware configuration of an electronic device in one embodiment of the present invention.

FIG. 4 is a block diagram showing the hardware configuration of the electronic devices 30 according to one embodiment of the present invention. The electronic devices 30 in this embodiment are smartphones. Each of the electronic devices 30 includes a processor 31, an input device 32, an output device 33, a storage device 34, and a communication device 35. These individual constituent devices are connected via a bus 36. Interfaces are interposed as needed between the bus 36 and the individual constituent devices. The individual elements, namely, the processor 31, the input device 32, the output device 33, the storage device 34, and the communication device 35, respectively correspond to and have configurations similar to those of the processor 11, the input device 12, the output device 13, the storage device 14, and the communication device 15 described above, and thus descriptions thereof will be omitted. In this embodiment, since the electronic devices 30 are smartphones, the output device 33 is a display 33, and the storage device 34 is a storage device provided in an ordinary smartphone, including a RAM, which is a volatile memory, and also including a ROM, which is a non-volatile memory. Alternatively, however, the electronic devices 30 may be other types of devices having the configuration described above, such as desktop personal computers, laptop personal computers, or tablets. In this case, the individual elements, namely, the processor 31, the input device 32, the output device 33, the storage device 34, and the communication device 35, respectively correspond to the processor 11, the input device 12, the output device 13, the storage device 14, and the communication device 15 described above.

The game server 20 is connected to the electronic device 30 of each user who plays a game via the network 2. In this embodiment, when a game app installed in the electronic device 30 is activated by each user, the electronic device 30 accesses the game server 20, and the game server 20 accepts access from each electronic device 30 and provides a game service via the network 2. At this time, the game server 20 stores game information including game logs of individual users in the storage device 24 and manages the game information. In one preferred example, the game server 20 has the function of a database server. In this case, the storage device 24 stores data (e.g., tables) and programs for a database, and the database is realized by executing the programs. In the case where the game server 20 is configured to include a plurality of server devices, one or more of the server devices may be database servers.

The storage device 24 of the game server 20 stores a game program, which is an application for a game, and the game server 20 provides the game by communicating with the electronic devices 30 of individual users. The game server 20 executes the game according to the input of game operations at the terminal devices of the users and sends the results of execution to the electronic devices 30 of the users. The game server 20 stores game logs including the content of operations performed by the individual users and manages the game logs.

The game provided by the game server 20 in this embodiment is what is called a digital collectible card game (DCCG). Specifically, the game in this embodiment proceeds while a user selects cards from a possessed card group constructed to include a plurality of cards and places those cards in a game field, whereby various events are executed in accordance with combinations of the cards or classes. The possessed card group is generally referred to as a card deck. Furthermore, the game in this embodiment is a battle game in which a plurality of users battle against each other by selecting cards from card decks and placing those cards in a game field 43. For example, each card has card definition information including a card ID, the kind of card, and parameters such as hit points, attacking power, and an attribute, and each class has class definition information. The kind of card is information indicating whether a card represents a character or an item.

The game server 20 stores information relating to the game for each user, such as cards possessed by that user, in association with the user ID. The game server 20 allows the user to obtain a card by a prescribed method in the game. The user can obtain a plurality of cards from all the preset kinds T of cards available in the game. The cards that are obtained may include cards of the same kind. In one example, the game server 20 performs lottery processing, such as gacha, in response to a user operation, thereby allowing the user to obtain a card. In one example, the game server stores an in-game currency associated with the user ID, and allows the user to obtain a desired card in response to a user operation performed by the user to obtain that card by consuming the in-game currency.

The game server 20 lets the user construct a card deck by selecting D cards from a plurality of cards obtained and possessed by the user. A card deck constituted of D cards is constructed in this manner. Therefore, the game in this embodiment is a game that proceeds while the user selects cards from a card deck constituted to include D cards and places those cards in the game field. In one example, when letting the user construct a card deck, the game server 20 lets the user select D cards on the basis of a prescribed rule, for example, such that the user is not allowed to select more than three cards of the same kind.

Figure 5:
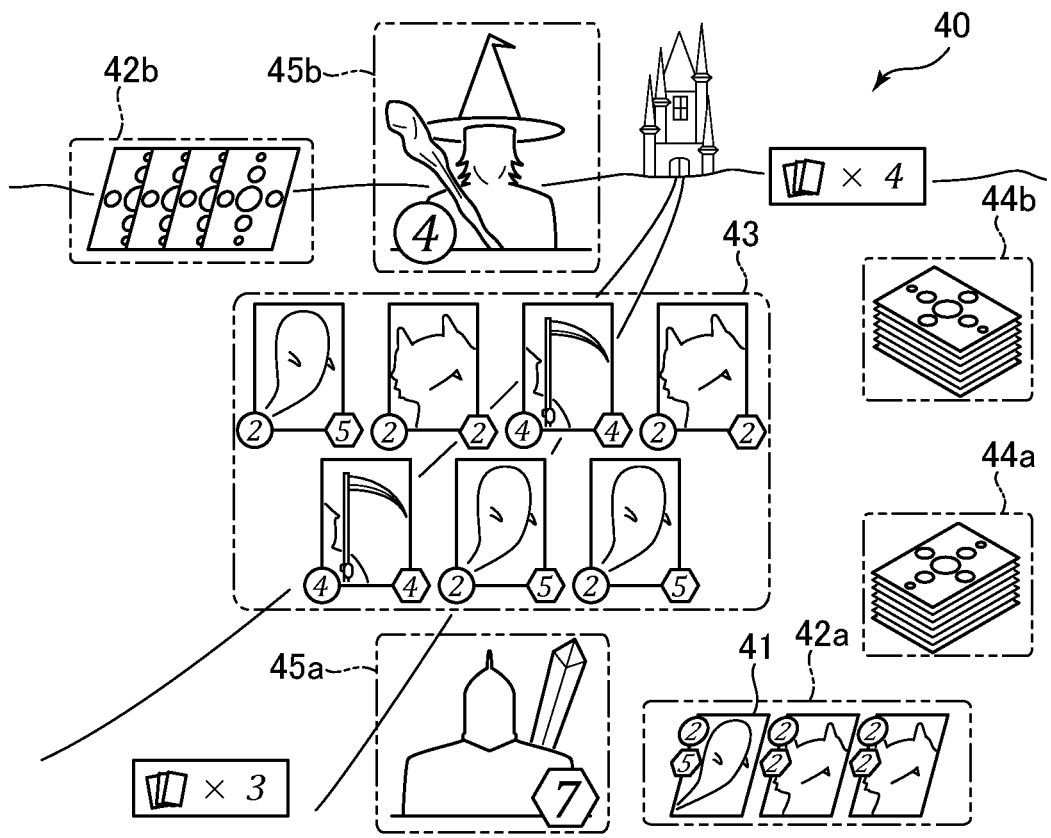
FIG. 5 shows an example game screen that is displayed on a display of an electronic device of a user.

FIG. 5 shows an example game screen that is displayed on the display 33 of the electronic device 30 of a user, which is a game screen 40 for a card battle between the local user, who is the user himself or herself operating the electronic device 30, and another user operating another electronic device 30. The game screen 40 shows a first card group 42a, which is the hand of the local user, and a first card group 42b, which is the hand of the other user. The game is configured so that the local user cannot recognize the content of the first card group 42b of the other user.

A card deck possessed by each user is constituted of a first card group 42, which is the hand of the user, and a second card group 44, which is the stock of the user. Whether each card 41 possessed by the user is included in the first card group 42 or the second card group 44 is determined in accordance with the proceeding of the game. The first card group 42 is a group of cards that can be selected and placed in the game field 43 by the user, and the second card group 44 is a group of cards that cannot be selected by the user. Although the card deck is constituted of a plurality of cards 41, depending on the proceeding of the game, there are cases where the card deck is constituted of a single card 41. The game proceeds as the individual users place cards 41 in the game field 43 from the individual first card groups 42 (42a and 42b). Note that the card deck of each user may be constituted of cards 41 of all different kinds, or may be constituted to include some cards 41 of the same kind. Furthermore, the kinds of cards 41 constituting the card deck of the local user may be different from the kinds of cards 41 constituting the card deck of the other user. In another example, the card deck possessed by each user is constituted of only the first card group 42.

The game screen 40 shows a character 45a selected by the local user and a character 45b selected by the other user. In this embodiment, a character that is selected by a user is different from characters associated with cards, and defines a class indicating the type of a card deck. The game in this embodiment is configured such that the cards 41 possessed by users vary depending on classes. In one example, the game in this embodiment is configured such that the kinds of cards that may constitute the card decks of individual users vary depending on classes. In one example, the game in this embodiment is configured such that effects that occur when cards 41 are placed in the game field 43 vary depending on parameters set in the card definition information.

A card set is a set of cards preset in the game, and includes all the kinds of cards preset in the game. In the game provided by the game server 20 in this embodiment, a card deck is constituted of D cards, which are individually selected from the T kinds of card included in the card set. Although it is assumed for convenience of description that D is 40 and T is 1,000 in this embodiment, it will be understood that there is no limitation to these values. Although the T kinds of cards are referred to as card-x ($1 \le x \le T$) for convenience of description, it will be understood that this notation serves for the purpose of distinction among the individual cards and that the actual names may be different. A game log includes a user ID, a class, and card deck information. The card deck information is information concerning the D cards constituting the card deck used by a user, and is preferably associated with the user ID. The game log need not include a class. In one example, the game server 20 stores each item of card deck information stored in game logs in association with at least one of the winning rate of the card deck, the usage rate of the card deck, and the number of user IDs associated with the card deck information.

Note that the cards 41 are an example of media, and the card deck (possessed card group) is an example of a possessed medium group constructed to include a plurality of media possessed by a user. The media may be characters, items, or the like. For example, a six-card set, i.e., a set constituted of six cards, can be expressed as a set constituted of six media. Furthermore, the card set preset in the game can be expressed as a medium set. For example, in the case where the medium set is constituted of media including characters and items, the game screen 40 shows characters or items themselves as the cards 41.

In Japanese Patent Application No. 2019-041261, the applicant proposed a medium extraction system 4 (not shown) for extracting combinations of arbitrary numbers of media included with high frequencies of occurrence in possessed medium groups. In one preferred example, a medium recommendation system 1 includes the medium extraction system 4. The medium extraction system 4 uses game logs stored in the game server 20 as described above. The medium extraction system 4 is configured to be able to extract combinations of arbitrary numbers of cards included with high frequencies of occurrence in card decks of individual users at the beginning of the game by using card deck information A including at least some items of card deck information among a plurality of items of card deck information used by a prescribed number of users and stored in game logs. The medium recommendation server 10 is configured to be able to communicate with the medium extraction system 4, and is configured to be able to receive the combinations of arbitrary numbers of cards having high frequencies of occurrence, extracted by the medium extraction system 4, from the medium extraction system 4. The medium recommendation server 10 can receive the combinations of arbitrary numbers of cards having high frequencies of occurrence, extracted by the medium extraction system 4, together with the frequencies of occurrence of the card combinations, from the medium extraction system 4.

In this embodiment, for convenience of description, there are cases where a card combination consisting of k cards (k is an integer greater than or equal to two) or a card combination pattern consisting of k cards is simply referred to as a k-card set. A k-card set having a high frequency of occurrence refers to a k-card set having a high frequency of occurrence in the card decks included in card deck information A. Therefore, the level of the frequency of occurrence of a k-card set is proportional to the number of instances of the k-card set included in the card decks included in card deck information A.

Next, the medium recommendation system 1 in a first embodiment of the present invention will be described. The medium recommendation system 1 is configured to be able to recommend, on the basis of a card or card combination, a card or card combination to be added to the card or card combination in order to constitute at least a portion of a card deck in the game in this embodiment. The medium recommendation system 1 is able to output, as recommendation information, cards or ($\beta-1$)-card sets needed for generating a $\beta$-card set ($2 \le \beta \le D$) including cards-$\alpha$ ($1 \le \alpha \le T$) wanted by the user of an electronic device 30. The $\beta$-card set including cards-$\alpha$ can be referred to as a recommended card group (recommended medium group).

Figure 6:
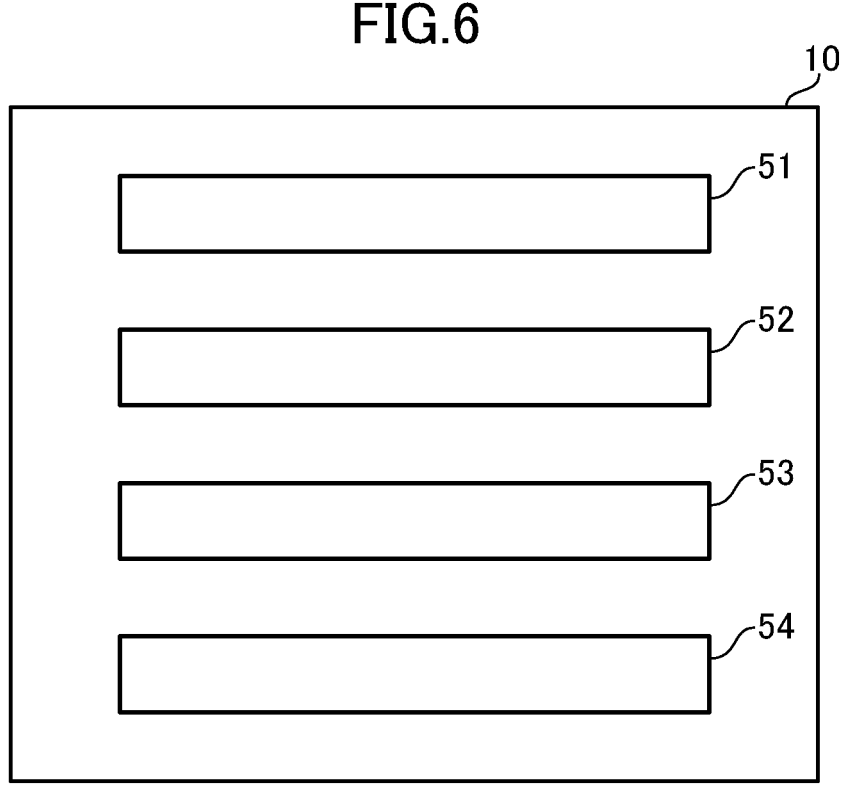
FIG. 6 is a functional block diagram of a medium recommendation server in a first embodiment of the present invention.
Figure 7:
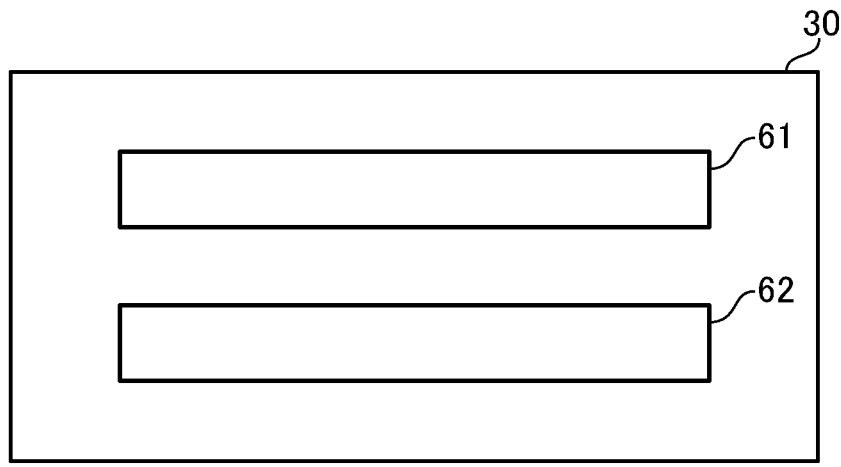
FIG. 7 is a functional block diagram of an electronic device in the first embodiment of the present invention.

FIG. 6 is a functional block diagram of the medium recommendation server 10 in the first embodiment of the present invention, and FIG. 7 is a functional block diagram of the electronic device 30 in the first embodiment of the present invention. The medium recommendation server 10 includes a table creation unit 51, a table storage unit 52, a medium input unit 53, and a medium recommendation unit 54. The electronic device 30 includes an input acceptance unit 61 and a recommended-medium display unit 62. In this embodiment, these functions are realized by the processor 11 and the processor 31 individually executing programs. In this embodiment, similarly to other embodiments, since various functions are realized by loading programs, a portion of one part (function) may be provided in another part. Alternatively, however, these functions may be realized by means of hardware by configuring electronic circuits or the like for realizing the individual functions in part or in entirety.

The table creation unit 51, for each kind of card, further extracts a prescribed number of k-card sets having high frequencies of occurrence from $Z_k$ kinds of k-card sets ($2 \le k \le D$) included with high frequencies of occurrence in card decks and extracted in advance by the medium extraction system 4. The table creation unit 51 creates a first table by associating, for each kind of card, a single card with cards or card combinations obtained by excluding that single card from the further extracted k-card sets.

In one preferred example, the prescribed number is a numerical value less than or equal to Y. In this case, the prescribed number of k-card sets refers to Y kinds of k-card sets at most. In one example, Y is 1 to 10. In the following description of embodiments of the present invention, it is assumed that the table creation unit 51 extracts Y kinds of k-card sets in descending order of the frequencies of occurrence for every kind of card, unless otherwise specifically mentioned. The table creation unit 51 extracts Y kinds of k-card sets in the case where it is possible to extract Y kinds of k-card sets in descending order of the frequencies of occurrence. In one preferred example, for each kind of card, the table creation unit 51 arranges k-card sets in descending order of the frequencies of occurrence and further extracts Y k-card sets in order from those having higher frequencies of occurrence. In one preferred example, $Z_k$ ($2 \leq k \leq D$)=Z, and for example, Z=10,000. However, Z may be somewhat increased or decreased depending on the value of k, for example, in the range of 8,000 to 12,000. In this embodiment, for convenience of description, it is assumed that $Z_k$ ($2 \leq k \leq D$)=Z.

The table storage unit 52 stores the first tables created by the table creation unit 51 in the storage device 14.

FIG. 8 shows an example of the first tables generated by the table creation unit 51 in the first embodiment. The key (primary key) in the first table is the T (1,000) kinds of cards card-1 to card-T. In the example shown in FIG. 8, the table creation unit 51 further extracts Y kinds of k-card sets in descending order of the frequencies of occurrence for each of the T kinds of cards for each value of k=2 to D(40), thereby creating first tables individually for k=2 to D.

In the case of k=2, for each of the T kinds of cards, the table creation unit 51 extracts Y kinds of two-card sets including that card and having high frequencies of occurrence, and associates that card with the cards obtained by excluding that card from the extracted two-card sets, thereby creating a first table. Card-1 is associated with Y cards, namely, card-$i_{1-1}$, card-$i_{1-2}$, . . . , and card-$i_{1-Y}$. Card-$i_{1-1}$ indicates one of card-1 to card-T, and card-$i_{1-1}$, card-$i_{1-2}$, . . . , and card-$i_{1-Y}$ are individually different cards. For example, card-$i_{1-1}$, card-$i_{1-2}$, . . . , and card-$i_{1-Y}$ are card-111, card-2, . . . , and card-842. The two-card set consisting of card-1 and card-$i_{1-1}$, the two-card set consisting of card-1 and card-$i_{1-2}$, . . . , and the two-card set consisting of card-1 and card-$i_{1-Y}$ are two-card sets including card-1 and arranged in descending order of the frequencies of occurrence in this order. Similarly, with card-2 to card-T, card-x ($1 \leq x \leq T$) is associated with Y cards, namely, card-$i_{x-1}$, card-$i_{x-2}$, . . . , and card-$i_{x-Y}$.

In the case of k=3, for each of the T kinds of cards, the table creation unit 51 extracts Y kinds of three-card sets including that card and having high frequencies of occurrence, and associates that card with the two-card sets obtained by excluding that card from the extracted three-card sets, thereby creating a first table. Card-1 is associated with Y two-card sets, namely, cardset-$i(2)_{1-1}$, cardset-$i(2)_{1-2}$, . . . , and cardset-$i_{1-Y}$. Cardset-$i(k-1)_{1-1}$ indicates one of combinations of (k−1) cards, and cardset-$i(k-1)_{1-1}$, cardset-$i(k-1)_{1-2}$, . . . , and cardset-$i(k-1)_{1-Y}$ are individually different (k−1)-card sets. For example, cardset-$i(2)_{1-1}$, cardset-$i(2)_{1-2}$, . . . , and cardset-$i(2)_{1-Y}$ are [(card-9, card-111)], [(card-2, card-842)], . . . , and [(card-2, card-3)]. The three-card set consisting of card-1 and cardset-$i(2)_{1-1}$, the three-card set consisting of card-1 and cardset-$i(2)_{1-2}$, . . . , and the three-card set consisting of card-1 and cardset-$i(2)_{1-Y}$ are three-card sets including card-1 and arranged in descending order of the frequencies of occurrence in this order. Similarly, with card-2 to card-T, card-x ($1 \leq x \leq T$) is associated with Y cardsets, namely, cardset-$i(2)_{x-1}$, cardset-$i(2)_{x-2}$, . . . , and cardset-$i(2)_{x-Y}$.

In the case of k=4 to D, similarly to the case of k=3, for each of the T kinds of cards, the table creation unit 51 extracts Y kinds of k-card sets including that card and having high frequencies of occurrence, and associates that card with the (k−1)-card sets obtained by excluding that card from the extracted k-card sets, thereby creating a first table. For example, in the case of k=40, as shown in FIG. 8, card-1 is associated with Y cardsets, namely, cardset-$i(39)_{1-1}$, cardset-$i(39)_{1-2}$, . . . , and cardset-$i(39)_{1-Y}$. The 40-card set consisting of card-1 and cardset-$i(39)_{1-1}$, the 40-card set consisting of card-1 and cardset-$i(39)_{1-2}$, . . . , and the 40-card set consisting of card-1 and cardset-$i(39)_{1-Y}$ are 40-card sets including card-1 and arranged in descending order of the frequencies of occurrence in this order. Similarly, with card-2 to card-T, card-x ($1 \leq x \leq T$) is associated with Y cardsets, namely, cardset-$i(39)_{x-1}$, cardset-$i(39)_{x-2}$, . . . , and cardset-$i(39)_{x-Y}$.

The input acceptance unit 61 accepts the input of one (card-α) of the T kinds of cards and the number (β) of cards constituting a recommended card group, which is a card combination including that card, via user operations on an electronic device 30. In this embodiment, the game server 20 provides a game for an electronic device 30 on which a game app has been activated, and the display 33 of the electronic device 30 displays a game screen. The game screen provided by the game server 20 includes a first input acceptance screen for obtaining medium recommendation information from the medium recommendation server 10, the medium recommendation information being information concerning recommended media. The first input acceptance screen is a screen for accepting inputs via user operations on the electronic device 30, such as touches on the display 33. The input acceptance unit 61 accepts the input of the kind of card card-α and the order β of a recommended card group (card combination) via the first input acceptance screen. The electronic device 30 sends the information accepted by the input acceptance unit 61 to the medium recommendation server 10. For convenience of description, the number of cards constituting a card combination will be referred to as the order of that card combination. For example, the order of a three-card set is three.

The medium input unit 53 receives the information accepted by the input acceptance unit 61 from the electronic device 30, and accepts the input of the kind of card card-α and the order β of a recommended card group.

The medium recommendation unit 54, by referring to the first table for k=β among the first tables stored in the table storage unit 52, determines, as first medium recommendation information, Y cards or card combinations associated with card-α accepted by the medium input unit 53. The medium recommendation unit 54 sends the determined first medium recommendation information to the electronic device 30.

The recommended-medium display unit 62 generates a first recommended-medium screen from the first medium recommendation information received from the medium recommendation server 10, and displays the first recommended-medium screen on the display 33. The first recommended-medium screen is a screen for presenting Y cards or card combinations associated with card-α to the user. In one example, the first recommended-medium screen is a screen for presenting Y cards or card combinations to the user, as arranged in descending order of the frequencies of occurrence. In another example, the first recommended-medium screen is a screen for presenting a card or card combination having the highest frequency of occurrence to the user and presenting a card or card combination having the next highest frequency of occurrence to the user in response to an operation by the user.

Next, the medium recommendation system 1 in a second embodiment of the present invention will be described. The medium recommendation system 1 is configured to be able to recommend a card to be added to a card combination on the basis of the card combination in order to constitute at least a portion of a card deck in a game in this embodiment. The medium recommendation system 1 can output, as recommendation information, one card card-$\alpha$ ($1 \leq \alpha \leq T$) to be added to a $\beta$-card set, wanted by the user of an electronic device 30. The functional block diagram of the medium recommendation system 1 in the second embodiment of the present invention is the same as that in FIG. 6. The following description will be directed mainly to differences from the first embodiment.

The table creation unit 51 uses Z kinds of k-card sets ($2 \leq k \leq D-1$) and Z kinds of (k+1)-card sets included with high frequencies of occurrence in card decks and extracted in advance by the medium extraction system 4. The table creation unit 51, for each of the Z kinds of k-card sets extracted in advance, generates T kinds of (k+1)-card sets by individually joining cards included in the card set. Therefore, the table creation unit 51 generates Z*T (k+1)-card sets. The table creation unit 51, for each of the Z kinds of k-card sets extracted in advance, calculates the individual frequencies of occurrence of the generated T kinds of (k+1)-card sets by referring to Z kinds of (k+1)-card sets having high frequencies of occurrence and extracted in advance. The table creation unit 51, for each of the Z kinds of k-card sets extracted in advance, further extracts a prescribed number of (Y) (k+1)-card sets having high frequencies of occurrence from the generated (k+1)-card sets. The table creation unit 51 creates a second table by associating each of the Z kinds of k-card sets extracted in advance with cards to be added to generate the further extracted (k+1)-card sets having high frequencies of occurrence. In one preferred example, for each of the Z kinds of k-card sets extracted in advance, the generated (k+1)-card sets are arranged in descending order of the frequencies of occurrence, and Y (k+1)-card sets are further extracted in order from those having higher frequencies of occurrence.

The table storage unit 52 stores the second tables created by the table creation unit 51 in the storage device 14.

FIG. 9 shows example second tables that are generated by the table creation unit 51 in the second embodiment. The key (primary key) in the second tables are the Z kinds of k-card sets extracted in advance by the medium extraction system 4. In the example shown in FIG. 9, the table creation unit 51 creates a second table for each of k=2 to D−1 (39) by further extracting Y kinds of (k+1)-card sets in descending order of the frequencies of occurrence for each of the Z kinds of k-card sets for each of k=2 to D−1 (39).

In the case of k=2, the table creation unit 51 creates a second table by extracting, for each of the Z kinds of two-card sets, Y kinds of three-card sets including that two-card set and having high frequencies of occurrence and by associating that two-card set with cards to be added to generate the extracted three-card sets.

Cardset-e(k)-1, cardset-e(k)-2, ..., and cardset-e(k)-Z are individually Z kinds of k-card sets extracted in advance by the medium extraction system 4. Cardset-e(2)-1 is associated with Y cards, namely, card-$e_{1\text{-}1}$, card-$e_{1\text{-}2}$, ..., and card-$e_{1\text{-}Y}$. Card-$e(k)_{1\text{-}1}$ indicates one of card-1 to card-T, and card-$e(k)_{1\text{-}1}$, card-$e(k)_{1\text{-}2}$, ..., and card-$e(k)_{1\text{-}Y}$ are individually different cards. The three-card set consisting of cardset-e(2)-1 and card-$e_{1\text{-}1}$, the three-card set consisting of cardset-e(2)-1 and card-$e_{1\text{-}2}$, ..., and the three-card set consisting of cardset-e(2)-1 and card-$e_{1\text{-}Y}$ are three-card sets including cardset-e(2)-1 and arranged in descending order of the frequencies of occurrence in this order. Similarly, with cardset-e(2)-2 to cardset-e(2)-Z, cardset-e(2)-x ($1 \leq x \leq Z$) is associated with Y cards, namely, card-e(2)$_{x\text{-}1}$, card-e(2)$_{x\text{-}2}$, ..., and card-e(2)$_{x\text{-}Y}$.

In the case of k=3 to D−1, similarly to the case of k=2, for each of the Z kinds of k-card sets, the table creation unit 51 extracts Y kinds of (k+1)-card sets including that k-card set and having high frequencies of occurrence, and associates that k-card set with cards to be added to generate the extracted (k+1)-card sets, thereby creating a second table. For example, in the case of k=39, as shown in FIG. 9, cardset-e(39)-1 is associated with Y cards, namely, card-e(39)$_{1\text{-}1}$, card-e(39)$_{1\text{-}2}$, ..., and card-e(39)$_{1\text{-}Y}$. The 40-card set consisting of cardset-e(39)-1 and card-e(39)$_{1\text{-}1}$, the 40-card set consisting of cardset-e(39)-1 and card-e(39)$_{1\text{-}2}$, ..., and the 40-card set consisting of cardset-e(39)-1 and card-e(39)$_{1\text{-}Y}$ are 40-card sets including cardset-e(39)-1 and arranged in descending order of the frequencies of occurrence in this order. Similarly, with cardset-e(39)-2 to cardset-e(39)-39, cardset-e(39)-x ($1 \leq x \leq Z$) is associated with Y cards, namely, card-e(39)$_{x\text{-}1}$, card-e(39)$_{x\text{-}2}$, ..., and card-e(39)$_{x\text{-}Y}$.

The input acceptance unit 61 accepts the input of a $\gamma$-card set, constituting at least a portion of a card deck, via a user operation on an electronic device 30. In this embodiment, the game screen provided by the game server 20 includes a second input acceptance screen for obtaining medium recommendation information from the medium recommendation server 10, the medium recommendation information being information concerning recommended media. The second input acceptance screen is a screen for accepting an input via a user operation on the electronic device 30, such as a touch on the display 33. The input acceptance unit 61 accepts the input of $\gamma$ cards constituting the $\gamma$-card set via the second input acceptance screen. The electronic device 30 sends the information accepted by the input acceptance unit 61 to the medium recommendation server 10.

The medium input unit 53 receives the information accepted by the input acceptance unit 61 from the electronic device 30, and accepts the input of $\gamma$ cards constituting the $\gamma$-card set.

The medium recommendation unit 54 determines whether or not the $\gamma$-card set accepted by the medium input unit 53 is a primary key in the second table for k=$\gamma$, stored in the table storage unit 52. The medium recommendation unit 54 determines the Y cards associated with the $\gamma$-card set as second medium recommendation information in the case where the $\gamma$-card set accepted by the medium input unit 53 is a primary key, and determines that there is no recommendation information as second medium recommendation information in the case where the $\gamma$-card set is not a primary key. The medium recommendation unit 54 sends the determined second medium recommendation information to the electronic device 30.

The recommended-medium display unit 62 generates a second recommended-medium screen from the second medium recommendation information received from the medium recommendation server 10, and displays the second recommended-medium screen on the display 33. The second recommended-medium screen is a screen for presenting Y cards associated with the $\gamma$-card set to the user. In one example, the second recommended-medium screen is a screen for presenting Y cards to the user, as arranged in descending order of the frequencies of occurrence. In another example, the second recommended-medium screen is a screen for presenting a card having the highest frequency of occurrence to the user and presenting a card having the next highest frequency of occurrence to the user in response to an operation by the user. In the case where there is no recommendation information as second medium recommendation information, the second recommended-medium screen indicates that there are no cards that can be recommended.

Next, the medium recommendation system 1 in a third embodiment of the present invention will be described. The table creation unit 51 creates the first tables that are created in the first embodiment and the second tables that are created in the second embodiment. The table storage unit 52 stores the first tables and second tables created by the table creation unit 51 in the storage device 14.

The game screen provided by the game server 20 and displayed on the display 33 includes a first input acceptance screen and a second input acceptance screen. The input acceptance unit 61 accepts the input of a kind of card card-α and the order β of cards in a recommended card group via the first input acceptance screen. The input acceptance unit 61 accepts the input of the γ cards constituting the γ-card set via the second input acceptance screen. The electronic device 30 sends the information accepted by the input acceptance unit 61 to the medium recommendation server 10.

The medium input unit 53, the medium recommendation unit 54, and the recommended-medium display unit 62 have the same functions as those in the first embodiment. Therefore, in the case where the electronic device 30 sends information accepted via the first input acceptance screen to the medium recommendation server 10, the recommended-medium display unit 62 generates a first recommended-medium screen from the first medium recommendation information received from the medium recommendation server 10, and displays the first recommended-medium screen on the display 33. Meanwhile, the medium input unit 53, the medium recommendation unit 54, and the recommended-medium display unit 62 have the same functions as those in the second embodiment. Therefore, in the case where the electronic device 30 sends information accepted via the second input acceptance screen to the medium recommendation server 10, the recommended-medium display unit 62 generates a second recommended-medium screen from the second medium recommendation information received from the medium recommendation server 10, and displays the second recommended-medium screen on the display 33.

Figure 10:
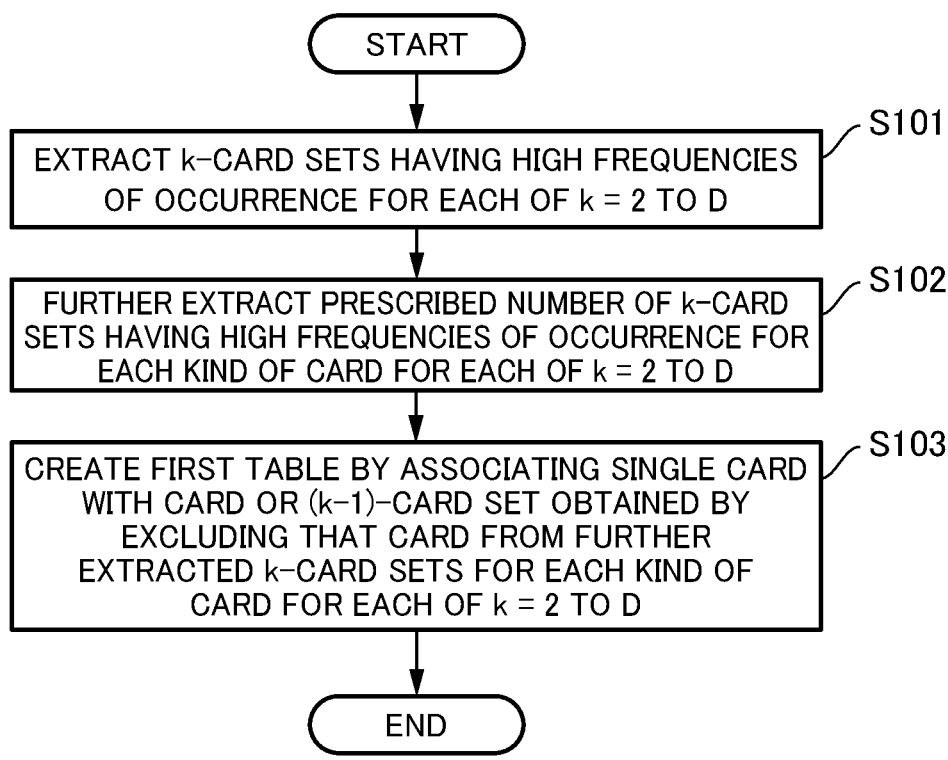
FIG. 10 shows a first example table creation method of a medium recommendation system in the first embodiment of the present invention.

Next, a table creation method of the medium recommendation system 1 in the first embodiment of the present invention will be described. FIG. 10 shows a first example table creation method of the medium recommendation system 1 in this embodiment.

In step 101, by using card deck information A including a prescribed plurality of items of card deck information, for each of k=2 to D, the medium extraction system 4 extracts Z kinds of k-card sets (2≤k≤D) included with high frequencies of occurrence in card decks A. In step 102, for each of k=2 to D, from the Z kinds of k-card sets having high frequencies of occurrence, extracted in step 101, the table creation unit 51 further extracts a prescribed number (Y kinds) of k-card sets having high frequencies of occurrence for each kind of card. In step 103, the table creation unit 51 creates a first table for each of k=2 to D by associating, for each kind of card, a single card with a card or card combination obtained by excluding that single card from the further extracted k-card sets.

Figure 11:
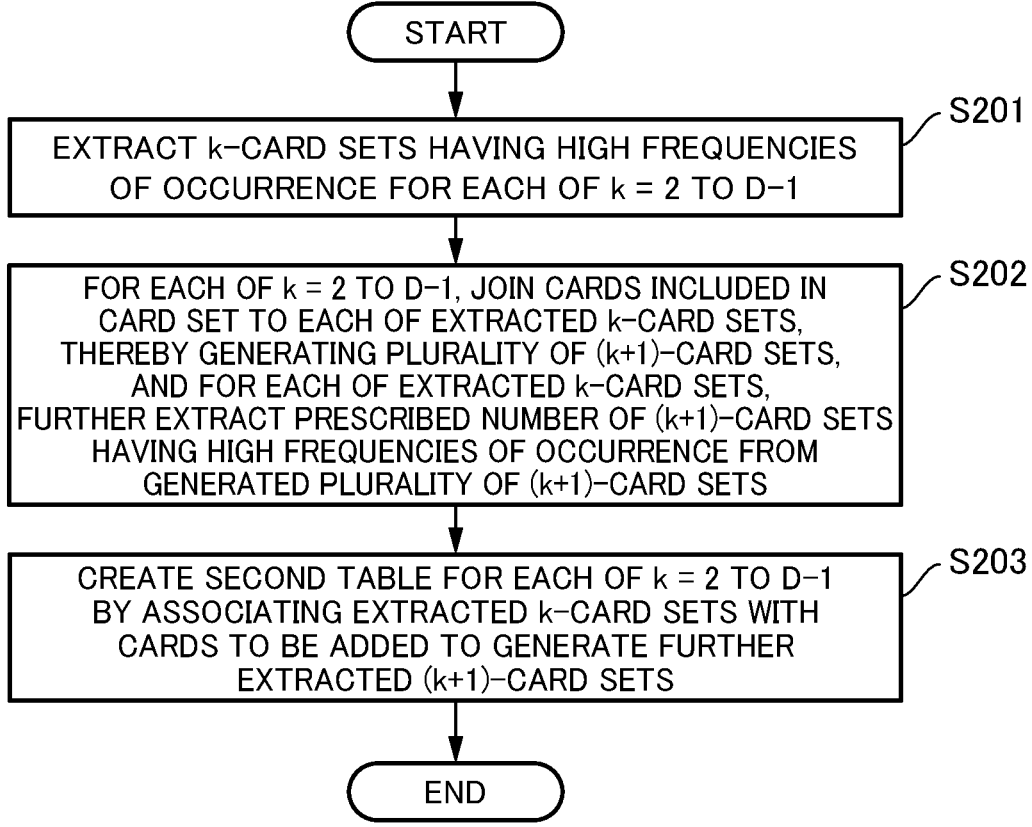
FIG. 11 shows a second example table creation method of the medium recommendation system in the second embodiment of the present invention.

Next, a table creation method of the medium recommendation system 1 in the second embodiment of the present invention will be described. FIG. 11 shows a second example table creation method of the medium recommendation system 1 in this embodiment.

In step 201, by using card deck information A including a prescribed plurality of items of card deck information, for each of k=2 to D−1, the medium extraction system 4 extracts Z kinds of k-card sets (2≤k≤D−1) included with high frequencies of occurrence in card decks A.

In step 202, for each of k=2 to D−1, the table creation unit 51 joins the card included in the card set individually to each of the Z kinds of k-card sets extracted in step 101, thereby generating T kinds of (k+1)-card sets. Then, for each of the Z kinds of k-card sets extracted in step 201, the table creation unit 51 calculates the individual frequencies of occurrence of the generated T kinds of (k+1)-card sets by referring to the Z kinds of (k+1)-card sets having high frequencies of occurrence, extracted in step 201. Then, for each of the Z kinds of k-card sets extracted in step 201, the table creation unit 51 further extracts a prescribed number (Y kinds) of (k+1)-card sets having high frequencies of occurrence from the generated (k+1)-card sets. In step 203, the table creation unit 51 creates a second table for each of k=2 to D−1 by associating each of the Z kinds of k-card sets extracted in step 201 with cards to be added to generate the further extracted (k+1)-card sets having high frequencies of occurrence.

Next, preferred examples of the first tables and second tables in the first to second embodiments will be described. In one preferred example, a hash index is implemented as a database index for the first tables and second tables. It is possible to readily implement a hash index, for example, by using a key-value storage such as Redis.

In the first tables and second tables in this example, keys are stored in the form of 32-bit or 64-bit integers and thus always have a fixed length, and values are always limited to a maximum of Y elements and thus always have a fixed length. The upper limit of the number of rows in a first table is T, and the upper limit of the number of elements included in a value in a first table is K. Thus, for each of k=2 to D, a first table has a size of T×K. In the case of D=40, Z=10,000, T=1,000, and Y=10, the table creation unit 51 converts a data table of 40×1,000 into an index of 40×1,000×10. The upper limit of the number of rows in a second table is Z, and the upper limit of the number of elements included in a value in a second table is K. Thus, for each of k=2 to D−1, a second table has a size of Z×K. In the case of D=40, Z=10,000, and Y=10, the table creation unit 51 converts a data table of 40×10,000 into an index of 40×10,000×10. Since it is possible to implement a hash index with a memory of about 60 megabytes, the medium recommendation system 1 can execute recommendation processing in an in-memory manner.

Next, the medium extraction system 4, which is a technology disclosed in Japanese Patent Application No. 2019-041261, will be described below.

The medium extraction system 4 includes a control device 70 and a plurality of computing devices 80, which are connected to a network so as to be able to communicate with each other. The control device 70 and the plurality of computing devices 80 each includes a configuration similar to that of an ordinary server, PC, or the like. The control device 70 includes a processor 71, an input device 72, an output device 73, a storage device 74, and a communication device 75. These individual constituent devices are connected via a bus 76. Each of the computing devices 80 includes a processor 81, an input device 82, an output device 83, a storage device 84, and a communication device 85. These individual constituent devices are connected via a bus 86. The processors 71 and 81 preferably include a GPU for performing general-purpose processing not including graphic rendering. Note that there are cases where a plurality of k-card sets extracted or merged by the control device 70 or one of the computing devices 80 are referred to as a plurality of kinds of k-card sets, as distinguished from a single k-card set.

The storage device 74 of the control device 70 stores card deck information A. The storage device 74 also stores all the kinds T of cards. The control device 70 controls parallel processing of the individual operations of the plurality of computing devices 80, allocating data to be processed individually by the plurality of computing devices 80 and causing the execution of the processing. Card deck information A is stored in the storage device 84 of each of the s computing devices 80. In one example, card deck information A is card deck information extracted from card deck information stored in game logs, on the basis of at least either of the winning rates and the usage rates of card decks associated with the card deck information. For example, card deck information A is created by extracting card deck information having winning rates exceeding 50% from the card deck information stored in the game logs. In one example, card deck information A is card deck information extracted from the card deck information stored in the game logs, on the basis of the number of user IDs associated with the card deck information. In one example, card deck information A and all the kinds T of cards are stored in a csv file. In one example, the game server 20 or the control device 70 extracts and creates card deck information A.

Conventionally, in the case where a card deck is constructed by selecting 40 cards from 1,000 kinds of cards, it has been difficult to exhaustively extract k-card sets having high frequencies of occurrence, where k signifies an arbitrary number, such as combinations having high frequencies of occurrence and constituted of two cards, constituted of three cards, constituted of four cards, . . . , and constituted of 39 cards. In particular, it has been difficult to extract 10 to 30-card sets having high frequencies of occurrence. Meanwhile it is possible with relative ease to calculate single cards having high frequencies of occurrence as well as two-card sets, 39-card sets, and 40-card sets having high frequencies of occurrence.

The medium extraction system 4 is configured to be able to execute additive inference processing and subtractive inference processing. These kinds of processing are realized by the processors of the control device 70 and the computing devices 80 individually executing programs.

In the additive inference processing, the medium extraction system 4 extracts single cards having high frequencies of occurrence, and extracts two-card sets having high frequencies of occurrence by using information of the extracted cards and card deck information A. Furthermore, the medium extraction system 4 extracts three-card sets having high frequencies of occurrence by using information of the extracted two-card sets and card deck information A. In this manner, the medium extraction system 4 extracts card combinations having high frequencies of occurrence among one-card sets to 20-card (D/2) sets.

In the subtractive inference processing, the medium extraction system 4 extracts 40-card sets having high frequencies of occurrence, and extracts 39-card sets having high frequencies of occurrence by using information of the extracted 40-card sets and card deck information A. Furthermore, the medium extraction system 4 extracts 38-card sets having high frequencies of occurrence by using information of the extracted 39-card sets and card deck information A. In this manner, the medium extraction system 4 extracts card combinations having high frequencies of occurrence among 40-card sets to 21-card (D/2+1) sets.

The medium extraction system 4 in this embodiment presupposes that, in a card game, a small number of specific cards or card combinations occupy most of the frequencies of occurrence, i.e., high unevenness in frequency (Zipf structure) exists.

The medium extraction system 4 in this embodiment realizes exhaustive extraction of combinations by filtering card combination candidates stepwise and performing inference recursively, while suppressing combinatorial explosion by utilizing the Zipf structure of data. In the additive inference processing, in the case where the medium extraction system 4 simply keeps only combinations having high frequencies through filtering, as the order of inference advances, the variety of elements constituting combinations becomes lost, and only combinations derived from specific combinations remain. As a result, the Zipf structure rapidly becomes lost and the frequency gradient disappears, and the filtering no longer functions effectively. Thus, in the medium extraction system 4 in this embodiment, global filtering is introduced to maintain the Zipf structure irrespective of the order.

Figure 12:
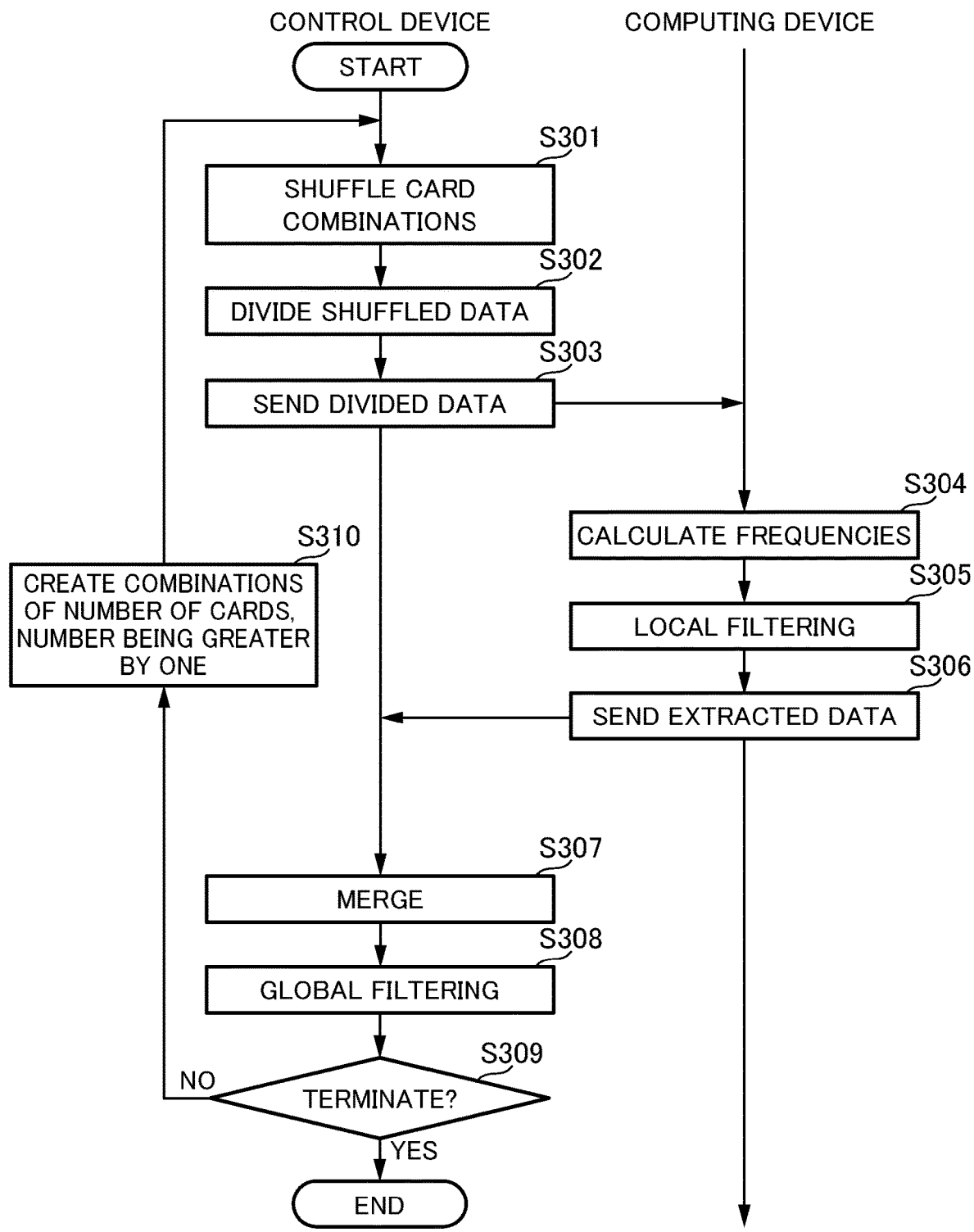
FIG. 12 explains additive inference processing of a medium extraction system that extracts combinations of k cards, where k signifies an arbitrary number.

FIG. 12 explains the additive inference processing by the medium extraction system 4 that extracts combinations of k cards, where k signifies arbitrary numbers. The storage device 74 of the control device 70 stores data concerning $X_k$ kinds of k-card sets. The data is data in which data concerning $X_k$ kinds of k-card sets are arrayed one by one in order; for example, the data has the data structure of a one-dimensional array in which data concerning $X_k$ kinds of k-card sets are arrayed in order. Note that, although there are cases where it is described that cards or card combinations are sent or received in the present description for convenience of description, it will be understood that this refers to sending or receiving data concerning cards or card combinations.

The control device 70 shuffles the order of array of the $X_k$ kinds of k-card sets (step 301). The control device 70 divides the shuffled k-card sets into s (step 302), and allocates and sends the divided $X_k$/s kinds of card combinations to each of the s servers (step 303).

Each of the computing devices 80, upon receiving the $X_k$/s kinds of k-card sets from the control device 70, calculates the individual frequencies of occurrence of the received k-card sets by referring to card deck information A stored in the storage device 24 for the individual $X_k$/s kinds of k-card sets (step 304). Each of the computing devices 80 extracts k-card sets having high frequencies of occurrence satisfying a first criterion through local filtering processing (step 305) and sends the k-card sets to the control device 70 (step 306).

The control device 70 merges the plurality of kinds of k-card sets received from the individual computing devices 80 (step 307). The control device 70 performs global filtering processing to cluster the merged plurality of kinds of k-card sets into a plurality of clusters and to extract k-card sets having high frequencies of occurrence satisfying a second criterion for each of the clusters (step 308).

The control device 70 determines whether or not to extract combinations of a number of cards, the number being further greater by one (step 309). In the case where it is determined in step 309 that card combinations are not to be extracted, the additive inference processing is terminated. In the case where it is determined in step 309 that card combinations are to be extracted, the control device 70 generates (k+1)-card sets, which are combinations of a number of cards, the number being greater by one (step 310). Assuming that $X_k'$ kinds of k-card sets are extracted in step 308, the control device 70 individually joins all the kinds of cards included in the card set to each of the $X_k'$ kinds of k-card sets, thereby generating T kinds of (k+1)-card sets (step 310). Since the control device generates T kinds of (k+1)-card sets from one kind of k-card set, as described above, the control device 70 generates ($X_k' \times T$) kinds ($X_{k+1}$ kinds) of (k+1)-card sets as a result. Then, the control device 70 can extract (k+1)-card sets by executing steps 301 to 310.

Next, the local filtering processing will be described. The first criterion is that in the case where k-card sets are selected in order from those having higher frequencies of occurrence, k-card sets are selected until the sum of the frequencies of occurrence of the selected k-card sets reaches a prescribed ratio of the sum of the frequencies of occurrence of the k-card sets, calculated by the computing devices 80 in step 304.

In one example, in step 304, each of the computing devices 80 calculates the numbers of the individual $X_k$'s kinds of k-card sets included in the card decks included in card deck information A, and rearranges the $X_k$'s kinds of k-card sets in descending order of the calculated numbers. In this case, for example, each of the computing devices 80 stores the $X_k$'s kinds of k-card sets, rearranged in descending order of the calculated numbers, in the storage device 24 by using the data structure of a one-dimensional array. The numbers calculated for the individual k-card sets correspond to the individual frequencies of occurrence of the k-card sets in the card decks included in card deck information A. Each of the computing devices 80 calculates the sum al of all the calculated numbers. Each of the computing devices 80, while selecting k-card sets in descending order of the calculated numbers, calculates the sum of the numbers for the selected k-card sets as α2. Assuming that the prescribed ratio is T1 (0≤T1≤1), k-card sets selected by each of the computing devices 80 before α2 reaches α1×T1 serve as k-card sets satisfying the first criterion.

Preferably, in the local filtering processing, before performing extraction processing using the first criterion, each of the computing devices 80 extracts k-card sets by reflecting card-deck building rules in the game, thereby reducing the number of combinations. Examples of the extraction reflecting card-deck building rules include extraction in which combinations of cards that are not allowed in specific battles are excluded and extraction in which kinds of cards that cannot be included depending on classes are excluded.

Next, the global filtering processing will be described. In step 307, the control device 70 merges the k-card sets received from the individual computing devices 80 by joining the k-card sets and sorting and arranging the result. In one preferred example, the control device 70 rearranges a plurality of kinds of k-card sets in descending order of the frequencies of occurrence. In this case, for example, the control device 70 stores the plurality of kinds of k-card sets, rearranged in descending order of the frequencies of occurrence, in the storage device 14 by using the data structure of a one-dimensional array.

In the clustering in step 38, the control device 70 clusters the merged plurality of kinds (Q kinds) of k-card sets into a plurality of kinds (P kinds) of clusters (subsets). Note that P<Q at this time. In one preferred example, as a clustering algorithm, the control device 70 uses agglomerative hierarchical clustering. As an algorithm for agglomerative hierarchical clustering, a known algorithm is used. In the case where this agglomerative hierarchical clustering is used, the control device 70 starts clustering with an array of k-card sets sorted in descending order of frequencies, from the state in which the individual k-card sets located adjacent to each other in the array constitute individual clusters. The control device 70 sequentially combines clusters when a plurality of adjacent k-card sets include not less than a prescribed number of or a prescribed ratio of common cards in accordance with the clustering level, thereby generating cluster layers. The control device 70 repeats recursively applying this processing until the number of clusters becomes a prescribed number or until there is no longer any cluster group including not less than the prescribed ratio of common cards. The control device 70 divides the plurality of kinds of k-card sets merged in step 308 into a plurality of clusters by using clusters in a layer in which the clustering algorithm has stopped or in a prescribed layer.

In step 308, for each of the clusters, the control device 70 calculates the sum of the frequencies of occurrence of the plurality of kinds of k-card sets set in that cluster. The control device 70 calculates a cluster frequency ratio for each of the clusters by using the calculated sum of the frequencies of occurrence. The second criterion is that when k-card sets are selected in descending order of the frequencies of occurrence, k-card sets are selected until the sum of the frequencies of occurrence of the selected k-card sets reaches a prescribed value based on the cluster frequency ratios.

Figure 13:
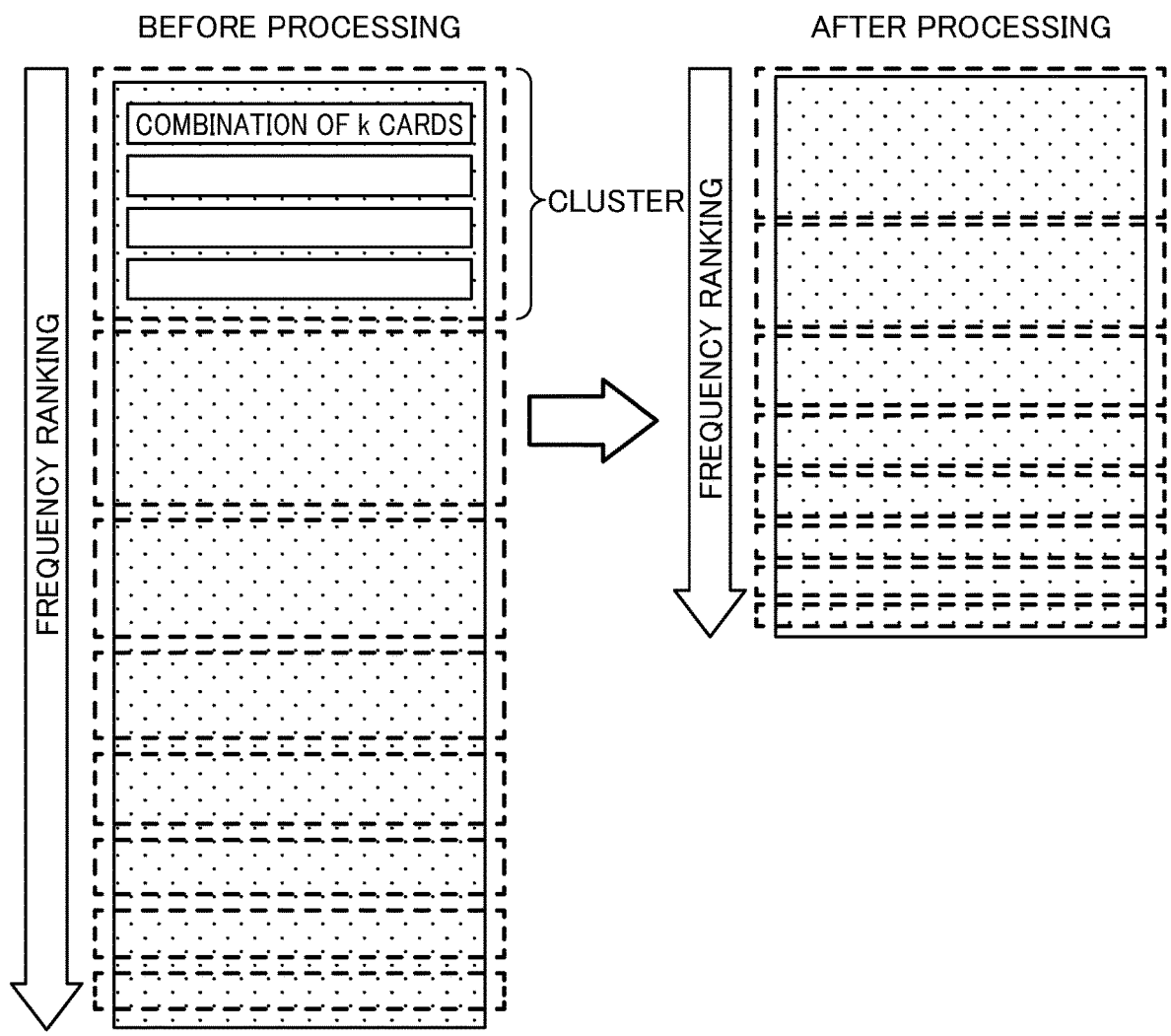
FIG. 13 explains global filtering processing.

FIG. 13 explains the global filtering processing. The left figure in FIG. 13 shows a state in which a plurality of kinds of k-card sets before the global filtering processing have been arranged in descending order of the frequencies of occurrence and have been clustered into a plurality of clusters. The right figure in FIG. 13 shows a state in which a plurality of kinds of k-card sets after the global filtering processing have been arranged in descending order of the frequencies of occurrence, while still having been clustered into the plurality of clusters. Preferably, a plurality of k-card sets are set in one cluster; however, only one k-card set may be set in one cluster. A plurality of k-card sets set in the same cluster include not less than a prescribed number of common cards.

In one example, the control device 70 calculates the sum β1 of all the frequencies of occurrence of the plurality of kinds of k-card sets before the global filtering processing. The control device 70 sets M individual clusters in a distinguishable manner, such as $CL_1$, $CL_2$, ... $CL_M$. The control device 70 calculates, for the individual clusters, the sums $\gamma_1$, $\gamma_2$, ... $\gamma_M$ of the frequencies of occurrence of the k-card sets set in those clusters. For example, the control device 70 calculates cluster frequency ratios, which are ratios of the individual clusters, from the sums $\gamma_1$, $\gamma_2$, ... $\gamma_M$ for the individual clusters to the total sum β1 (=$\gamma_1+\gamma_2...\gamma_M$). The control device 70 presets T2 as the target number of card combinations after the global filtering processing, and sets the product of T2 and the cluster frequency ratio of each cluster as an upper limit of the frequencies of occurrence of the k-card sets in that cluster. For cluster $CL_1$, while selecting k-card sets in descending order of the frequencies of occurrence, the control device 70 calculates the sum of the frequencies of the selected k-card sets as $\delta_1$. Assuming that the upper limit of the frequencies of occurrence of the k-card sets set in cluster $CL_1$ is $UL_1$, k-card sets selected by the control device 70 before $\delta_1=UL_1$ is satisfied serve as k-card sets satisfying the second criterion.

The threshold T2 corresponds to Z described earlier. The medium extraction system 4 (control device 70) can determine thresholds T1 and T2 for filtering processing by using the result of the immediately preceding inference processing, i.e., the result of extraction of (k−1)-card sets in the additive inference processing. The medium extraction system 4 (control device 70) can maintain exhaustiveness in relation to the total number by utilizing high unevenness among the frequencies of individual combinations in the Zipf structure, while considerably reducing the number of card combinations.

Next, the first processing in the additive inference processing will be described. As described earlier, in the first processing in the additive inference processing, the medium extraction system 4 extracts single cards having high frequencies of occurrence.

The control device 70 shuffles the order of array of T kinds ($X_1$ kinds) of single cards (step 301). The control device 70 divides the shuffled single cards into s (step 302), and allocates and sends T/s kinds of divided cards to each of the s servers (step 303).

Each of the computing devices 80, upon receiving the T/s kinds of cards from the control device 70, calculates the individual frequencies of occurrence of the received cards by referring to card deck information A stored in the storage device 24 for these individual cards (step 304). Each of the computing devices 80 extracts cards having high frequencies of occurrence satisfying a predetermined criterion through the local filtering processing (step 305), and sends the extracted cards to the control device 70 (step 306).

The control device 70 merges the plurality of cards received from the individual computing devices 80 (step 307). The control device 70 skips steps 308 and 309 and generates two-card sets, which are combinations of a number of cards, the number being greater by one (step 310). Assuming that $X_1$ kinds of cards are merged in step 307, the control device 70 individually joins all the kinds of cards included in the card set to each of the $X_1$ kinds of cards, thereby generating T kinds of two-card sets (step 310). Since the control device generates T kinds of two-card sets from a single card in this manner, the control device 70 generates ($X_1 \times T$) kinds ($X_2$ kinds) of two-card sets as a result. Note that the control device 70 may be configured to execute step 308 by adjusting the threshold T2 for the filtering processing.

Then, the control device 70 can extract k-card sets, where k signifies an arbitrary number, by repeatedly executing steps 301 to 310.

The prescribed criterion, which is similar to the first criterion, is that in the case where cards are selected in descending order of the frequencies of occurrence, cards are selected until the sum of the frequencies of occurrence of the selected cards reaches a prescribed ratio of the sum of the frequencies of occurrence of cards, calculated by the computing devices 80 in step 304.

FIG. 14 explains the subtractive inference processing by the medium extraction system 4 for extracting combinations of k cards, where k signifies an arbitrary number.

The control device 70 shuffles the order of array of $X_k$ kinds of k-card sets (step 401). The control device 70 divides the shuffled k-card sets into s (step 402), and allocates and sends the $X_k$/s kinds of divided card combinations to each of the s servers (step 403).

Each of the computing devices 80, upon receiving the $X_k$/s kinds of k-card sets from the control device 70, calculates the individual frequencies of occurrence of the received k-card sets by referring to card deck information A stored in the storage device 24 for the individual $X_k$/s kinds of k-card sets (step 404). Each of the computing devices 80 extracts k-card sets having high frequencies of occurrence satisfying the first criterion through the local filtering processing (step 405) and sends the extracted k-card sets to the control device 70 (step 406).

The control device 70 merges the plurality of kinds of k-card sets received from the individual computing devices 80 (step 407). The control device 70 performs the global filtering processing to cluster the merged plurality of kinds of k-card sets into a plurality of clusters and to extract card combinations having high frequencies of occurrence satisfying the second criterion for each of the clusters (step 408).

The control device 70 determines whether or not to extract combinations of a number of cards, the number being further fewer by one (step 409). In the case where it is determined in step 409 that card combinations are not to be extracted, the subtractive inference processing is terminated. In the case where it is determined in step 409 that card combinations are to be extracted, the control device 70 generates (k−1)-card sets, which are combinations of a number of cards, the number being fewer by one (step 410). Assuming that $X_k'$ kinds of k-card sets are merged in step 408, the control device 70 individually excludes single cards among the cards constituting the $X_k'$ kinds of k-card sets from the k-card sets, thereby generating new k kinds of (k−1)-card sets. Since the control device 70 generates k kinds of (k−1)-card sets from one kind of k-card set, as described above, the control device 70 generates ($X_k' \times k$) kinds ($X_{k-1}$ kinds) of (k−1)-card sets as a result.

The local filtering processing and the global filtering processing are similar to those in the case of the additive inference processing. Note that also in the subtractive inference processing, thresholds T1 and T2 are determined similarly to the case of the additive inference processing, and the thresholds T2 corresponds to Z described earlier.

Next, the first processing in the subtractive inference processing will be described. As described earlier, in the first processing in the subtractive inference processing, the medium extraction system 4 extracts 39-card sets from 40-card sets.

The control device 70 shuffles the order of array of 40-card sets for the number of users included in card deck information A (step 401). The control device 70 divides the shuffled 40-card sets into s (step 402), and allocates and sends the divided $X_{40}$/s kinds of card combinations to each of the s servers (step 403).

Each of the computing devices 80, upon receiving the $X_{40}$/s kinds of 40-card sets from the control device 70, calculates the individual frequencies of occurrence of the received 40-card sets by referring to card deck information A stored in the storage device 24 for the individual $X_{40}$/s kinds of 40-card sets (step 404). Each of the computing devices 80 extracts k-card sets having high frequencies of occurrence satisfying the first criterion through the local filtering processing (step 405), and sends the extracted k-card sets to the control device 70 (step 406). However, each of the computing devices 80 may skip step 405.

The control device 70 merges the plurality of kinds of 40-card sets received from the individual computing devices 80 (step 407). The control device 70 skips steps 408 and 409, and the control device 70 generates 39-card sets, which are combinations of a number of cards, the number being fewer by one (step 410). Assuming that $X_{40}'$ kinds of 40-card sets are merged in step 407, the control device 70 individually excludes single cards among the cards constituting the 40-card sets from each of $X_{40}'$ kinds of 40-card sets, thereby generating new 40 kinds of 39-card sets. Since the control device 70 generates 40 kinds of 39-card sets from one kind of 40-card set in this manner, the control device 10 generates ($X_{40}'\times 40$) kinds ($X_{39}$ kinds) of 39-card sets as a result. Note that the control device 70 may be configured to execute step 408 by adjusting the threshold T2 for the filtering processing.

Then, the control device 70 can extract k-card sets, where k signifies an arbitrary number, by repeatedly executing steps 401 to 410.

As described above, by executing local filtering and global filtering, it becomes possible for the medium extraction system 4 to execute additive and subtractive inference processing in a practical time even in a situation where combinatorial explosion occurs. Specifically, by employing two kinds of filtering processing, it becomes possible to keep the number of card combination patterns within a certain number while maintaining the tendencies of the original set in terms of global variations, thereby suppressing combinatorial explosion. Furthermore, through progressive filtering in which two kinds of filtering processing are combined with additive or subtractive inference processing, it becomes possible to extract k-card sets while not discarding mathematically important combinations. Therefore, with the configuration described above, the medium extraction system 4 can exhaustively extract combinations of arbitrary numbers of cards in data processing that could result in combinatorial explosion.

In one example, card deck information A is created by extracting card deck information having winning rates exceeding a prescribed winning rate from card deck information stored in game logs. In this case, it becomes possible for the medium extraction system 4 to exhaustively extract combinations of arbitrary numbers of cards adopted by users having high skill levels and having high frequencies of occurrence.

The storage device 74 of the control device 70 stores Z kinds of data for each of 2 to D-card sets having high frequencies of occurrence. In one preferred example, the medium extraction system 4 regularly performs batch processing to extract Z kinds of data for each of 2 to D-card sets having high frequencies of occurrence and to store the data in the storage device 74.

When creating first tables or second tables, the medium recommendation server 10 receives Z kinds of data for each of 2 to D-card sets having high frequencies of occurrence from the medium extraction system 4.

When the medium extraction system 4 is expressed in terms of functional blocks, the medium extraction system 4 includes a storage unit and an extraction unit. The storage unit stores card deck information A. The extraction unit, which is realized by means of information processing by the control device 70 and the computing devices 80 described above, can calculate the individual frequencies of occurrence of m-card sets ($2 \leq m \leq D$) by referring to card deck information A stored in the storage unit, and can extract m-card sets having high frequencies of occurrence satisfying a prescribed criterion. Furthermore, the extraction unit can generate a plurality of (m+1)-card sets by individually joining cards included in the card set to each of the extracted m-card sets, or can generate a plurality of (m−1)-card sets by individually excluding single cards among the cards constituting each of the extracted m-card sets from that m-card set. In one preferred example, the extraction unit regularly and individually extracts 2 to D-card sets having high frequencies of occurrence satisfying a prescribed criterion, and the medium recommendation server 10 regularly creates first tables and second tables on the basis of the extracted 2 to D-card sets having high frequencies of occurrence.

Next, the main operations and advantages of the medium recommendation system 1 in the embodiments of the present invention will be described.

Since recent DCCGs are run continuously for several years, there are cases where the number of items available for users in a game exceeds thousands. In such DCCGs, users often obtain unintended cards, and the utility of individual cards often change depending on the game environment, such as the properties of newly added cards. In such situations, for users, in particular, for newly participating users, it is not easy to recognize what kinds of cards exist in a game and what kinds of combinations thereof are available, and it is difficult to even know of the existence of cards that the users themselves do not possess. Therefore, what kinds of strong card decks can be formed from cards that a user currently possesses or which cards are to be added in order to form strong card combinations from cards that a user currently possesses is very useful for the user. With existing information recommendation technology, such as technology for recommending products, used at e-commerce sites, etc., however, application to technology for recommending cards or card combinations suitable for a user in a DCCG has been difficult. Furthermore, in the case where elements that result in combinatorial explosion are included in a DCCG, it has been impossible to obtain card combinations having Z high-ranking frequencies of occurrence among arbitrary card combinations.

In the embodiments, as described earlier, the medium extraction system 4 exhaustively extracts combinations of arbitrary numbers of cards, having high frequencies of occurrence. The medium recommendation system 1 generates at least either first tables or second tables on the basis of k-card sets having high frequencies of occurrence and extracted in advance by the medium extraction system 4. On the basis of the first tables, the medium recommendation system 1 recommends N-card sets having high frequencies of occurrence on the basis of a single card designated by the user. On the basis of the second cards, the medium recommendation system 1 recommends single cards having high frequencies of occurrence on the basis of N cards designated by the user. As described above, in the embodiments, the medium extraction system 4 can exhaustively extract combinations of arbitrary numbers of cards, which could result in combinatorial explosion. Furthermore, it becomes possible for the medium recommendation system 1 to learn card combinations having high frequencies of occurrence and to output recommendation information indicating cards to be added or the like. Furthermore, since the medium recommendation system 1 executes processing by using tables, it becomes possible to output recommendation information indicating cards to be added or the like at high speed.

Furthermore, in a preferred example, the medium extraction system 4 exhaustively extracts combinations of arbitrary numbers of cards adopted by users having high skill levels and having high frequencies of occurrence. With this configuration, it becomes possible for the medium recommendation system 1 to recommend cards or card combinations at high speed so that card combinations adopted by users having high skill levels will be formed from cards currently possessed by a user. This makes it possible to recommend cards or card combinations suitable for the user at high speed. For example, it becomes possible to provide the user with "deck-building know-how" as official information, which has hitherto been dependent on something external to a game.

The medium recommendation system 1 is a system that enables high-speed card recommendation based on 1-to-N relationships and N-to-1 relationships by using two kinds of tables. Therefore, it is possible to apply the present technology to general-purpose technology for learning the tendencies of combinations of finite items of content and recommending information.

Furthermore, in a preferred example, the first tables and second tables are tables in which the number of rows and the number of elements are restricted, and are tables in which hash indices are implemented (hash tables). In this case, in the case of D=40, Z=10,000, T=1,000, and Y=10, which are practical assumptions, the total size of both the first tables and the second tables is about 60 megabytes. Thus, these tables may have a size that can be loaded in an in-memory manner in each of the medium recommendation server 10 and the electronic devices 30, and implementation is relatively easy. Furthermore, with this configuration, since it is possible to implement information processing by the information recommendation unit 54 as processing for searching hash tables, having the computational complexity $O(1)$, it is possible to make the execution time extremely short, which enables frequent information recommendation in a game. Therefore, a small number of server devices constituting the medium recommendation server 10 suffices. Note that the medium recommendation system 1 can create the first tables and second tables in about 20 hours.

In a further preferred example, the medium extraction system 4 regularly executes batch processing to extract Z kinds of data for each of 2 to D-card sets having high frequencies of occurrence and to store the data in the storage device 74. In this case, the medium recommendation server 10 can also regularly execute batch processing to regularly update the first tables and second tables. With this configuration, it becomes possible for the medium recommendation system 1 to recommend cards or card combinations suitable for a user in accordance with the current game environment.

The operations and advantages described above also apply similarly to other embodiments and other examples unless otherwise specifically mentioned.

An embodiment of the present invention may be the medium recommendation system 1 or the medium recommendation server 10 (medium recommendation device) described above. Another embodiment of the present invention may be a table creation system or a table creation method for realizing information processing in which at least either of the first tables and the second tables included in the medium recommendation system 1 are created. Another embodiment of the present invention may be a program for realizing the functions or the information processing shown in the flowcharts in the above-described embodiments of the present invention, or a computer-readable storage medium storing the program. Furthermore, another embodiment of the present invention may be a method for realizing the functions or the information processing shown in the flowcharts in the above-described embodiments of the present invention. Furthermore, another embodiment of the present invention may be a server that is capable of providing a computer with a program for realizing the functions or the information processing shown in the flowcharts in the above-described embodiments of the present invention. Furthermore, another embodiment of the present invention may be a virtual machine for realizing the functions or the information processing shown in the flowcharts in the above-described embodiments of the present invention.

Example applications of the embodiments of the present invention will be described below.

In a first example application, the game server 20 provides a deck construction screen for allowing a user to construct a card deck by selecting cards one by one from a plurality of cards possessed by the user, and the electronic device 30 displays the deck construction screen on the display 33 as the game proceeds. In this example, the deck construction screen also functions as the second input acceptance screen for obtaining medium recommendation information.

The input acceptance unit 61 accepts, as the input of a γ-card set, cards that have been selected so far by the user in the deck construction screen. The electronic device 30 sends the information accepted by the input acceptance unit 61 to the medium recommendation server 10, and the medium input unit 53 receives the information accepted by the input acceptance unit 61 from the electronic device 30 to accept the input of γ cards constituting a γ-card set. The medium recommendation unit 54 determines second medium recommendation information by using the second table for k=γ, stored in the table storage unit 52. The recommended-medium display unit 62 generates a second recommended-medium screen from the second medium recommendation information received from the medium recommendation server 10, and displays the second recommended-medium screen on the display 33. The second recommended-medium screen is a screen for presenting Y cards associated with the γ-card set to the user. For example, the second recommended-medium screen is a screen in which a window for presenting Y cards arranged in descending order of the frequencies of occurrence is displayed in a superimposed manner on a game screen provided by the game server 20.

With this configuration, when building a card deck, it becomes possible to search a second table by using N cards selected so far by the user as a query, thereby obtaining candidates of (N+1)-th cards. This makes it possible to recommend cards that are more suitable for the user. Furthermore, it becomes possible to implement card recommendation processing with relative ease.

In a second example application, the game server 20 provides a card generation screen for allowing a user to generate a new card that is not possessed by the user, and the electronic device 30 displays the card generation screen on the display 33 as the game proceeds. In this example, the card generation screen also functions as the first input acceptance screen for obtaining medium recommendation information.

The input acceptance unit 61 accepts the input of each card (card-$\alpha_1$, card-$\alpha_2$, ..., card-$\alpha_x$) not possessed by the user. The electronic device 30 sends the information accepted by the input acceptance unit 61 to the medium recommendation server 10, and the medium input unit 53 receives the information accepted by the input acceptance unit 61 from the electronic device 30 to accept the input of each card not possessed by the user. The medium recommendation unit 54 extracts each of (D−1)-card sets associated with the individual cards not possessed by the user by using the first table for k=D, stored in the table storage unit 52. The medium recommendation unit 54 further extracts (D−1)-card sets constituted only of cards possessed by the user among the extracted (D−1)-card sets, together with the cards associated therewith. Here, it will be understood that the associated cards are cards (kinds of cards) associated in the first table and the cards accepted for input by the input acceptance unit 61 and not possessed by the user. The medium recommendation unit 54 arranges D-card sets constituted of the further extracted (D−1)-card sets and the cards associated therewith, in descending order of the frequencies of occurrence, by referring to D-card sets having high frequencies of occurrence and extracted by the medium extraction system 4, as well as the frequencies of occurrence thereof. The medium recommendation unit 54 determines, as third medium recommendation information, the D-card sets constituted of the (D−1)-card sets and the cards associated therewith, arranged in descending order of the frequencies of occurrence. The medium recommendation unit 54 sends the determined third medium recommendation information to the electronic device 30.

The recommended-medium display unit 62 generates a third recommended-medium screen from the third medium recommendation information received from the medium recommendation server 10, and displays the third recommended-medium screen on the display 33. The third recommended-medium screen is a screen for presenting new cards not possessed by the user and (D−1)-card sets associated with those cards, arranged in descending order of the frequencies of occurrence, to the user. For example, the third recommended-medium screen is a screen in which a window for presenting new cards not possessed by the user and the (D−1)-card sets associated with those cards, arranged in descending order of the frequencies of occurrence, is displayed in a superimposed manner on a game screen provided by the game server 20.

With this configuration, when generating a card not possessed by the user, it becomes possible to sort cards not yet possessed in an order convenient for the user. This makes it possible to recommend cards more suitable for the user.

In a third example application, the game server 20 provides a screen for suggesting a single card to be modified in a card deck constructed by the user, and the electronic device 30 displays the screen on the display 33 in response to an operation by the user. In this example, the input acceptance unit 61 accepts the input of a D-card set constituting the card deck constructed by the user, without using the first input acceptance screen or the second input acceptance screen.

In this example, the medium recommendation server 10 further includes a main control unit 55. When the information accepted by the input acceptance unit 61 is sent to the medium recommendation server 10 from the electronic device 30, the main control unit 55 generates D kinds of (D−1)-card sets and passes the D kinds of (D−1)-card sets to the medium input unit 53, and the medium input unit 53 accepts the input of each of the D kinds of (D−1)-card sets. The medium recommendation unit 54 determines second medium recommendation information for each of the D kinds of (D−1)-card sets by using the second table for k=D−1, stored in the table storage unit 52. The medium recommendation unit 54 extracts, for each of the D kinds of (D−1)-card sets, D-card sets constituted only of cards possessed by the user among Y kinds of D-card sets constituted of that (D−1)-card set and the individual items of second medium recommendation information (Y cards) associated therewith. The medium recommendation unit 54 further extracts a prescribed number of D-card sets having higher frequencies of occurrence than the D-card set of the card deck constructed by the user, among all the extracted D-card sets, by referring to the D-card sets having high frequencies of occurrence and extracted by the medium extraction system 4, as well as the frequencies of occurrence thereof. The medium recommendation unit 54 determines, as fourth medium recommendation information, the individual (D−1)-card sets and cards associated therewith, constituting the further extracted D-card sets.

The recommended-medium display unit 62 generates a fourth recommended-medium screen from the fourth medium recommendation information received from the medium recommendation server 10, and displays the fourth recommended-medium screen on the display 33. The fourth recommended-medium screen is a screen for presenting, to the user, a (D−1)-card set and a single card to be modified in the card deck constructed by the user. For example, the fourth recommended-medium screen is a screen for presenting, to the user, a (D−1)-card set and a single card to be modified, constituting the D-card set having the highest frequency of occurrence, and for presenting, to the user, a (D−1)-card set and a single card to be modified, having the next highest frequency of occurrence, in response to an operation by the user.

The main control unit 55 may generate a plurality of kinds of τ-card sets (2≤τ≤D−1) and may pass the τ-card sets to the medium input unit 53, and the medium input unit 53 may accept the input of each of the τ-card sets. Note that also in this case, the medium recommendation unit 54 executes the above-described processing by using the second tables. Furthermore, the main control unit 55 is configured to preferentially recommend fourth medium recommendation information determined in cases where the value of τ is large.

With this configuration, it becomes possible to suggest a suitable card modification to a user in the case where a suitable card combination can be obtained by replacing a single card from a card deck constructed by the user. This makes it possible to recommend cards that are more suitable for the user.

In a fourth example application, the game server 20 provides a deck construction screen for allowing a user to construct a card deck by selecting cards one by one from a plurality of cards possessed by the user, and the electronic device 30 displays the deck construction screen on the display 33 as the game proceeds. In this example, the deck construction screen also functions as the first input acceptance screen for obtaining medium recommendation information.

The input acceptance unit 61 accepts the input of a card (card-α) initially selected by the user in the deck construction screen. The electronic device 30 sends the information accepted by the input acceptance unit 61 to the medium recommendation server 10, and the medium input unit 53 receives the information accepted by the input acceptance unit 61 from the electronic device 30 to accept the input of card-a. The medium recommendation unit 54 determines first medium recommendation information by using the first table for k=D, stored in the table storage unit 52. The recommended-medium display unit 62 generates a first recommended-medium screen from the first medium recommendation information received from the medium recommendation server 10, and displays the first recommended-medium screen on the display 33. The first recommended-medium screen is a screen for presenting (D−1)-card sets associated with card-α, arranged in descending order of the frequencies of occurrence, to the user. For example, the first recommended-medium screen is a screen in which a window for presenting (D−1)-card sets arranged in descending order of the frequencies of occurrence is displayed in a superimposed manner on a game screen provided by the game server 20.

With this configuration, it becomes possible to provide a user with information for constructing a meaningful deck including a specific card when building a card deck. This makes it possible to recommend cards that are more suitable for a user.

Now, modifications of the embodiments of the present invention will be described. The modifications described below can be combined as appropriate and applied to any embodiment of the present invention as long as no inconsistency arises. Descriptions will be directed mainly to differences from the embodiments described above.

In one modification, the game server 20 includes the medium recommendation server 10. In another modification, the medium recommendation server 10 is not connected to the network 2, and is configured to be able to carry out PtoP communication with the game server 20. In this case, the electronic device 30 receives the first medium recommendation information or the second medium recommendation information via the game server 20 by carrying out communication with the game server 20.

In one modification, the electronic device 30 has installed therein a special app for receiving and displaying medium recommendation information in the game provided by the game server 20. Upon the activation of the app, the electronic device 30 displays either the first input acceptance screen or the second input acceptance screen in accordance with user operations.

In one modification, the medium recommendation system 1 includes the medium recommendation server 10 and the game server 20. The medium recommendation server 10 includes the table creation unit 51, the table storage unit 52, the input acceptance unit 61, the medium recommendation unit 54, and the recommended-medium display unit 62. The medium recommendation server 10 includes a display 13 as the output device 13, and displays an input acceptance screen on the display 13 upon the activation of a special app. The input acceptance screen includes the first input acceptance screen and the second input acceptance screen.

The input acceptance unit 61 accepts the input of a kind of card card-α and the order β of cards in a recommended card group via the first input acceptance screen. The medium recommendation unit 54 determines, as first medium recommendation information, Y cards or card combinations associated with card-α accepted by the input acceptance unit 61, by referring to the first table for k=β among the first tables stored in the table storage unit 52. The recommended-medium display unit 62 generates a first recommended-medium screen from the first medium recommendation information determined by the medium recommendation unit 54, and displays the first recommended-medium screen on the display 13.

The input acceptance unit 61 accepts the input of γ cards constituting a γ-card set via the second input acceptance screen. In the case where the γ-card set accepted by the medium input unit 53 is a primary key, the medium recommendation unit 54 determines the Y cards associated with the γ-card set as second medium recommendation information, and in the case where the γ-card set is not a primary key, the medium recommendation unit 54 determines that there is no recommendation information as second medium recommendation information. The recommended-medium display unit 62 generates a second recommended-medium screen from the second medium recommendation information determined by the medium recommendation unit 54, and displays the second recommended-medium screen on the display 13.

In one modification, a single first table including individual tables for k=2 to D is provided. In this case, the primary keys are combinations of k and keys. In another modification, a single second table including individual tables for k=2 to D-1 is provided. In this case, the primary keys are combinations of k and keys.

In one modification in the first embodiment, the input acceptance unit 61 accepts the input of a single card (card-α) among T kinds of cards in response to a user operation on the electronic device 30 via the first input acceptance screen. The electronic device 30 sends the information accepted by the input acceptance unit 61 to the medium recommendation server 10. The medium input unit 53 receives the information accepted by the input acceptance unit 61 from the electronic device 30 to accept the input of the kind of card card-α. The medium recommendation unit 54 determines, as first medium recommendation information, Y cards or card combinations associated with card-α accepted by the medium input unit 53, by referring to a predetermined first table among the first tables stored in the table storage unit 52. The medium recommendation unit 54 sends the determined first medium recommendation information to the electronic device 30. In one preferred example, the predetermined first table among the first tables is the first table for k=40.

In one modification in the second embodiment, the table creation unit 51 generates a plurality of (k+1)-card sets by individually joining cards, obtained by excluding cards having frequencies of occurrence less than a prescribed value among the cards included in the card set, to each of the Z kinds of k-card sets extracted in advance. With this configuration, it becomes possible to reduce the amount of information processing.

In one modification in the second embodiment, in the case where it is determined by the medium recommendation unit 54 that there is no recommendation information as second medium recommendation information, a second input acceptance screen prompting, as a new input, a (γ−1)-card sets included in γ-card set accepted by the medium input unit 53 is displayed.

The processing or operation described above may be modified freely as long as no inconsistency arises in the processing or operation, such as an inconsistency that a certain step utilizes data that may not yet be available in that step. Furthermore, the examples described above are examples for explaining the present invention, and the present invention is not limited to those examples. The present invention can be embodied in various forms as long as there is no departure from the gist thereof.

REFERENCE SIGNS LIST

1 Medium recommendation system
2 Network
4 Medium extraction system
10 Medium recommendation server
11, 21, 31, 71, 81 Processor
12, 22, 32, 72, 82 Input device
13, 23, 33, 73, 83 Output device
14, 24, 34, 74, 84 Storage device
15, 25, 35, 75, 85 Communication device
16, 26, 36, 76, 86 Bus
20 Game server
30 Electronic device
40 Game screen
41 Card
42 First card group
43 Game field
44 Second card group
45 Character 51 Table creation unit
52 Table storage unit
53 Medium input unit
54 Medium recommendation unit
55 Main control unit
61 Input acceptance unit
62 Recommended-medium display unit

The invention claimed is:

1. A medium recommendation system for recommending media or sets of media in a game that proceeds as a user selects media from a possessed medium group constructed to include D media and places the media in a game field, the recommended media or sets of media being media or sets of media to be added to a medium in order to construct at least a portion of the possessed medium group from the medium, wherein the possessed medium group comprises individual media that are individually selected from T kinds of media included in a medium set preset in the game, the medium recommendation system comprising:
   a processor; and
   a memory connected to the processor, wherein the memory comprises one or more programs configured to perform a method comprising:
   accepting the input of a single medium among the T kinds of media;
   storing first tables created by further extracting a prescribed number of sets of media having high frequencies of occurrence, for each kind of medium, from sets of media consisting of k ($2 \leq k \leq D$) media, the sets of media being included with high frequencies of occurrence in a plurality of possessed medium groups used by a prescribed plurality of users, and the sets of media being extracted in advance on the basis of possessed-medium-group information concerning the plurality of possessed medium groups, and by associating, for each kind of medium, a single medium with media or sets of media obtained by excluding that medium from the further extracted sets of media; and
   outputting, as recommendation information, the media or sets of media with which the single medium is associated in the first tables.

2. A table creation system comprising:
   a processor; and
   a memory connected to the processor, wherein the memory comprises one or more programs for creating tables for recommending media or sets of media in a game that proceeds as a user selects media from a possessed medium group constructed to include D media and places the media in a game field, the recommended media or sets of media being media or sets of media to be added to a medium in order to construct at least a portion of the possessed medium group from the medium, wherein the possessed medium group comprises individual media that are individually selected from T kinds of media included in a medium set preset in the game,
   wherein tables are created by further extracting a prescribed number of sets of media having high frequencies of occurrence, for each kind of medium, from sets of media consisting of k ($2 < k \leq D$) media, the sets of media being included with high frequencies of occurrence in a plurality of possessed medium groups used by a prescribed plurality of users, and the sets of media being extracted in advance on the basis of possessed-medium-group information concerning the plurality of possessed medium groups, and by associating, for each kind of medium, a single medium with media or sets of media obtained by excluding that medium from the further extracted sets of media.

3. A medium recommendation device for recommending media or sets of media in a game that proceeds as a user selects media from a possessed medium group constructed to include D media and places the media in a game field, the recommended media or sets of media being media or sets of media to be added to a medium in order to construct at least a portion of the possessed medium group from the medium, wherein the possessed medium group comprises individual media individually selected from T kinds of media included in a medium set preset in the game, the medium recommendation device comprising:
   a processor; and
   a memory connected to the processor, wherein the memory comprises one or more programs configured to perform a method comprising:
   accepting the input of a single medium among the T kinds of media;
   storing first tables created by further extracting a prescribed number of sets of media having high frequencies of occurrence, for each kind of medium, from sets of media consisting of k ($2 < k \leq D$) media, the sets of media being included with high frequencies of occurrence in a plurality of possessed medium groups used by a prescribed plurality of users, and the sets of media being extracted in advance on the basis of possessed-medium-group information concerning the plurality of possessed medium groups, and by associating, for each kind of medium, a single medium with media or sets of media obtained by excluding that medium from the further extracted sets of media; and
   outputting, as recommendation information, the media or sets of media with which the single medium is associated in the first tables.

4. A table creation method for creating tables for recommending media or sets of media in a game that proceeds as a user selects media from a possessed medium group constructed to include D media and places the media in a game field, the recommended media or sets of media being media or sets of media to be added to a medium in order to construct at least a portion of the possessed medium group from the medium, wherein the possessed medium group comprises individual media individually selected from T kinds of media included in a medium set preset in the game, the table creation method comprising:
   extracting, for each of k=2 to D, sets of media consisting of k ($2 \leq k \leq D$) media, the sets of media being included with high frequencies of occurrence in a plurality of possessed medium groups used by a prescribed plurality of users, on the basis of possessed-medium-group information concerning the plurality of possessed medium groups;
   extracting, for each of k=2 to D, a prescribed number of sets of media having high frequencies of occurrence, for each kind of medium, from the extracted sets of media consisting of k media and having high frequencies of occurrence; and
   creating tables, for each of k=2 to D, by associating, for each kind of medium, a single medium with media or sets of media obtained by excluding that medium from the further extracted sets of media.

5. A medium recommendation system for recommending media in a game that proceeds as a user selects media from a possessed medium group constructed to include D media and places the media in a game field, the recommended media being media to be added to a set of media in order to construct at least a portion of the possessed medium group from the set of media, wherein the possessed medium group comprises individual media that are individually selected from a medium set preset in the game and including T kinds of media, the medium recommendation system comprising:
- a processor; and
- a memory connected to the processor, wherein the memory comprises one or more programs configured to perform a method comprising:
- accepting the input of a set of media consisting of k media ($2 \leq k \leq D-1$) and constituting at least a portion of the possessed medium group;
- storing second tables generated by, while using sets of media consisting of k media and sets of media consisting of (k+1) media, these sets of media being included with high frequencies of occurrence in a plurality of possessed medium groups used by a prescribed plurality of users and being extracted in advance on the basis of possessed-medium-group information concerning the plurality of possessed medium groups, individually joining media included in the medium set to each of the sets of media consisting of k media and extracted in advance, thereby generating a plurality of sets of media consisting of (k+1) media, calculating, for each of the sets of media consisting of k media and extracted in advance, the individual frequencies of occurrence of the plurality of generated sets of media consisting of (k+1) media with reference to the sets of media consisting of (k+1) media and extracted in advance, thereby further extracting, for each of the sets of media consisting of k media and extracted in advance, a prescribed number of sets of media consisting of (k+1) media and having high frequencies of occurrence from the plurality of generated sets of media consisting of (k+1) media, and associating the individual sets of media consisting of k media and extracted in advance with media to be added in order to generate the further extracted sets of media consisting of (k+1) media and having high frequencies of occurrence; and
- outputting, as recommendation information, the media to be added in order to generate the set of media consisting of (k+1) media and with which the set of media consisting of k media and is associated in the second tables.

6. The medium recommendation system according to claim 5, wherein the second tables are generated by, while using sets of media consisting of k media ($2 \leq k \leq D-1$) and sets of media consisting of (k+1) media, these sets of media being included with high frequencies of occurrence in a plurality of possessed medium groups used by a prescribed plurality of users and being extracted in advance on the basis of possessed-medium-group information concerning the plurality of possessed medium groups, individually joining T kinds of media included in the medium set to each of the sets of media consisting of k media and extracted in advance, thereby generating T sets of media consisting of (k+1) media, calculating, for each of the sets of media consisting of k media and extracted in advance, the individual frequencies of occurrence of the T generated sets of media consisting of (k+1) media with reference to the sets of media consisting of (k+1) media and extracted in advance, thereby further extracting, for each of the sets of media consisting of k media and extracted in advance, a prescribed number of sets of media consisting of (k+1) media and having high frequencies of occurrence from the T generated sets of media consisting of (k+1) media, and associating the individual sets of media consisting of k media and extracted in advance with media to be added in order to generate the further extracted sets of media consisting of (k+1) media and having high frequencies of occurrence.

7. A table creation system comprising:
- a processor; and
- a memory connected to the processor, wherein the memory comprises one or more programs for creating tables for recommending media in a game that proceeds as a user selects media from a possessed medium group constructed to include D media and places the media in a game field, the recommended media being media to be added to a set of media in order to construct at least a portion of the possessed medium group from the set of media, wherein the possessed medium group comprises individual media that are individually selected from a medium set preset in the game and including T kinds of media,
- wherein tables are created by, while using sets of media consisting of k media ($2 \leq k \leq D-1$) and sets of media consisting of (k+1) media, these sets of media being included with high frequencies of occurrence in a plurality of possessed medium groups used by a prescribed plurality of users and being extracted in advance on the basis of possessed-medium-group information concerning the plurality of possessed medium groups, individually joining media included in the medium set to each of the sets of media consisting of k media and extracted in advance, thereby generating a plurality of sets of media consisting of (k+1) media, calculating, for each of the sets of media consisting of k media and extracted in advance, the individual frequencies of occurrence of the plurality of generated sets of media consisting of (k+1) media with reference to the sets of media consisting of (k+1) media and extracted in advance, thereby further extracting, for each of the sets of media consisting of k media and extracted in advance, a prescribed number of sets of media consisting of (k+1) media and having high frequencies of occurrence from the plurality of generated sets of media consisting of (k+1) media, and associating the individual sets of media consisting of k media and extracted in advance with media to be added in order to generate the further extracted sets of media consisting of (k+1) media and having high frequencies of occurrence.

8. A medium recommendation device for recommending media in a game that proceeds as a user selects media from a possessed medium group constructed to include D media and places the media in a game field, the recommended media being media to be added to a set of media in order to construct at least a portion of the possessed medium group from the set of media, wherein the possessed medium group comprises individual media that are individually selected from a medium set preset in the game and including T kinds of media, the medium recommendation device comprising:
- a processor; and
- a memory connected to the processor, wherein the memory comprises one or more programs configured to perform a method comprising:
- accepting the input of a set of media consisting of k media ($2 < k \leq D-1$) and constituting at least a portion of the possessed medium group;
- storing second tables generated by, while using sets of media consisting of k media and sets of media consisting of (k+1) media, these sets of media being included with high frequencies of occurrence in a plurality of possessed medium groups used by a prescribed plurality of users and being extracted in advance on the basis of possessed-medium-group information concerning the plurality of possessed medium groups, individually joining media included in the medium set to each of the sets of media consisting of k media and extracted in advance, thereby generating a plurality of sets of media consisting of (k+1) media, calculating, for each of the sets of media consisting of k media and extracted in advance, the individual frequencies of occurrence of the plurality of generated sets of media consisting of (k+1) media with reference to the sets of media consisting of (k+1) media and extracted in advance, thereby further extracting, for each of the sets of media consisting of k media and extracted in advance, a prescribed number of sets of media consisting of (k+1) media and having high frequencies of occurrence from the plurality of generated sets of media consisting of (k+1) media, and associating the individual sets of media consisting of k media and extracted in advance with media to be added in order to generate the further extracted sets of media consisting of (k+1) media and having high frequencies of occurrence; and outputting, as recommendation information, the media to be added in order to generate the set of media consisting of (k+1) media and with which the set of media consisting of k media and is associated in the second tables.

9. A table creation method for creating tables for recommending media in a game that proceeds as a user selects media from a possessed medium group constructed to include D media and places the media in a game field, the recommended media being media to be added to a set of media in order to construct at least a portion of the possessed medium group from the set of media, wherein the possessed medium group comprises individual media that are individually selected from a medium set preset in the game and including T kinds of media, the table creation method comprising:

a step of extracting, for each of k=2 to D−1, sets of media consisting of k media (2≤k≤D−1) and included with high frequencies of occurrence in a plurality of possessed medium groups used by a prescribed plurality of users, on the basis of possessed-medium-group information concerning the plurality of possessed medium groups;

a step of individually joining, for each of k=2 to D−1, media included in the medium set to each of the extracted sets of media consisting of k media, thereby generating a plurality of sets of media consisting of (k+1) media, calculating, for each of the extracted sets of media consisting of k media, the individual frequencies of occurrence of the plurality of generated sets of media consisting of (k+1) media with reference to the extracted sets of media consisting of (k+1) media, thereby further extracting, for each of the extracted sets of media consisting of k media, a prescribed number of sets of media consisting of (k+1) media and having high frequencies of occurrence from the plurality of generated sets of media consisting of (k+1) media; and a step of creating a table by associating, for each of k=2 to D−1, the individual extracted sets of media consisting of k media with media to be added in order to generate the further extracted sets of media consisting of (k+1) media and having high frequencies of occurrence.

10. The table creation system according to claim 2, further comprising:

a medium extraction system for extracting combinations of arbitrary numbers of media, included with high frequencies of occurrence in the possessed medium groups, wherein the medium extraction system is configured to perform a second method comprising:

storing the possessed-medium-group information; and calculating the individual frequencies of occurrence of the sets consisting of m media (2≤m≤D) with reference to the possessed-medium-group information, and extracting sets consisting of m media and having high frequencies of occurrence satisfying a prescribed criterion, generating a plurality of sets consisting of (m+1) media by individually joining media included in the medium set to each of the extracted sets, or is capable of generating a plurality of sets consisting of (m−1) media by individually excluding, from each of the extracted sets, a single medium among the media constituting the extracted set.

11. The table creation system according to claim 10, wherein the second method of the medium extraction system further comprises extracting regularly and individually sets consisting of 2 to D media and having high frequencies of occurrence satisfying a prescribed criterion, and wherein the first method of the table creation system further comprises creating regularly tables on the basis of sets of k media (2≤k≤D) included with high frequencies of occurrence in the possessed medium groups.

* * * * *